United States Patent [19]

Burrows

[11] Patent Number: 4,694,411

[45] Date of Patent: Sep. 15, 1987

[54] SIMULATION APPARATUS AND METHOD

[75] Inventor: James L. Burrows, Merrimack, N.H.

[73] Assignee: Sanders Associates, Inc., Nashua, N.H.

[21] Appl. No.: 698,286

[22] Filed: Feb. 4, 1985

[51] Int. Cl.⁴ .......................... G06F 15/20; G06F 9/44
[52] U.S. Cl. ...................................... 364/578; 364/200
[58] Field of Search ................ 364/200, 300, 900, 578

[56] References Cited

U.S. PATENT DOCUMENTS

| | | | |
|---|---|---|---|
| 4,084,235 | 4/1978 | Hirtle et al. | 364/200 |
| 4,342,093 | 7/1982 | Miyoshi | 364/578 |
| 4,484,266 | 11/1984 | Becker et al. | 364/200 |
| 4,494,191 | 1/1985 | Itoh | 364/200 |
| 4,513,374 | 4/1985 | Hooks, Jr. | 364/200 |
| 4,527,249 | 7/1985 | Van Brunt | 364/578 |
| 4,583,169 | 4/1986 | Cooledge | 364/300 |

Primary Examiner—Felix D. Gruber
Attorney, Agent, or Firm—Richard I. Seligman

[57] ABSTRACT

A method and apparatus for simulating a network comprising a plurality of processing elements useful in simulating, for example, complex digital combinatorial electronic logic circuits. Each type of digital logic element is assigned a symbol, and the symbols are stored in an array pattern in a memory, with the row and column addresses of the symbols in memory corresponding to their position in the network. The simulator sequentially retrieves each element in the network starting from an input and determines the element response to an input signal based on the type of element and the signals input to it. After all of the elements in the network have been processed, the simulated output of the network is available at the network output elements.

18 Claims, 26 Drawing Figures

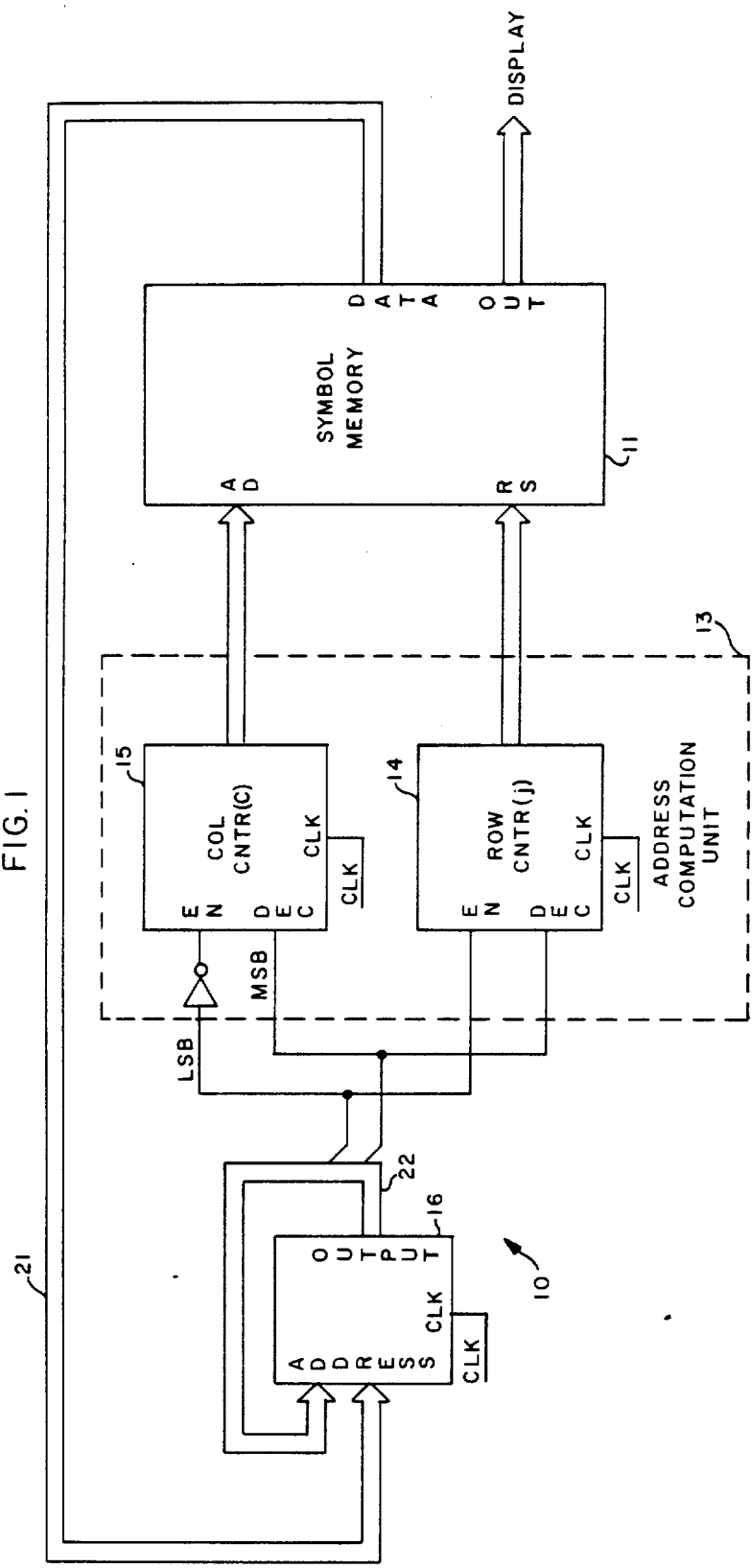
FIG.1
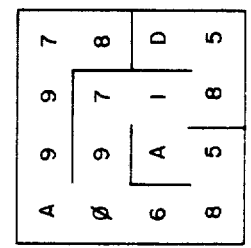
FIG.3C
CELL MAP IN SYMBOL MEMORY
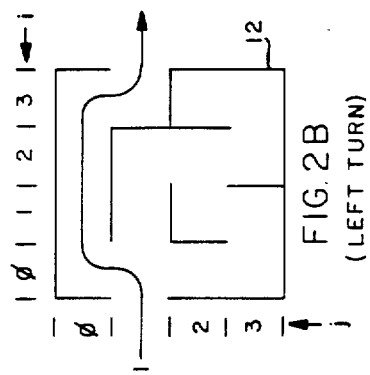
FIG.2B (LEFT TURN)
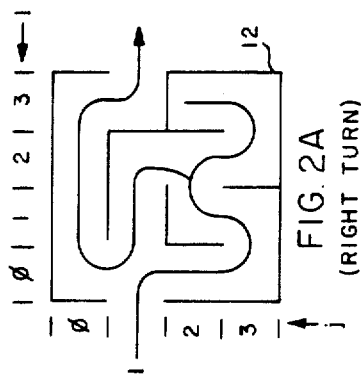
FIG.2A (RIGHT TURN)

FIG 3A
TURN STRATEGY
| CELL FORM | ID | RIGHT | | | | LEFT | | | |
|---|---|---|---|---|---|---|---|---|---|
| | | E | S | W | N | E | S | W | N |
| · | 0 | 1 | 2 | 3 | 0 | 3 | 0 | 1 | 2 |
| ·\| | 1 | 1 | 2 | – | 3 | 3 | 1 | – | 2 |
| ·_ | 2 | 0 | 2 | 3 | – | 3 | 0 | 2 | – |
| \|· | 3 | – | 1 | 3 | 0 | – | 0 | 1 | 3 |
| ⎺· | 4 | 1 | – | 2 | 0 | 0 | – | 1 | 2 |
| ·⌋ | 5 | 3 | 2 | – | – | 3 | 2 | – | – |
| \|·\| | 6 | – | 1 | – | 3 | – | 1 | – | 3 |
| ⌐· | 7 | 1 | – | – | 2 | 1 | – | – | 2 |
| ⌊· | 8 | – | 0 | 3 | – | – | 0 | 3 | – |
| ·⎯ | 9 | 0 | – | 2 | – | 0 | – | 2 | – |
| ⌈· | A | – | – | 1 | 0 | – | – | 1 | 0 |
| ⌊·⌋ | B | – | 3 | – | – | – | 3 | – | – |
| ·⌉ | C | 2 | – | – | – | 2 | – | – | – |
| ⌈·⌉ | D | – | – | – | 1 | – | – | – | 1 |
| ⌊·⌉ | E | – | – | 0 | – | – | – | 0 | – |
| ⌈·⌉ | F | – | – | – | – | – | – | – | – |
FIG 3B
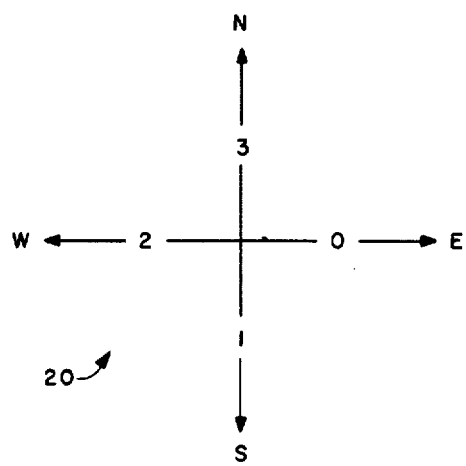
FIG 5C
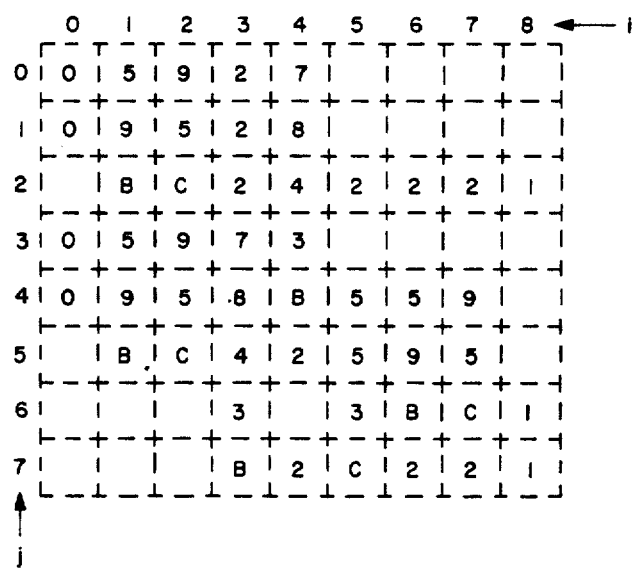

| STEP | CELL ADRS (I,J) | CELL ID | ENTRY DIR | EXIT DIR | FSN OUTPUT (LINE 22) | ENABLE COL CNTR | ENABLE ROW CNTR | NEXT ADRS | |
|---|---|---|---|---|---|---|---|---|---|
| 0 | 0,1 | 0 | E(0) | S(1) | 1(01) | NO | INC | 0,2 | ENTRY POINT |
| 1 | 0,2 | 6 | S(1) | S(1) | 1(01) | NO | INC | 0,3 | |
| 2 | 0,3 | 8 | S(1) | E(0) | 0(00) | INC | NO | 1,3 | |
| 3 | 1,3 | 5 | E(0) | N(3) | 3(11) | NO | DEC | 1,2 | |
| 4 | 1,2 | A | N(3) | E(0) | 0(00) | INC | NO | 2,2 | |
| 5 | 2,2 | 1 | E(0) | S(1) | 1(01) | NO | INC | 2,3 | |
| 6 | 2,3 | 8 | S(1) | E(0) | 0(00) | INC | NO | 3,3 | |
| 7 | 3,3 | 5 | E(0) | N(3) | 3(11) | NO | DEC | 3,2 | |
| 8 | 3,2 | D | N(3) | S(1) | 1(01) | INC | NO | 3,3 | |
| 9 | 3,3 | 5 | S(1) | W(2) | 2(10) | DEC | NO | 2,3 | |
| 10 | 2,3 | 8 | W(2) | N(3) | 3(11) | NO | DEC | 2,2 | |
| 11 | 2,2 | 1 | N(3) | N(3) | 3(11) | NO | DEC | 2,1 | |
| 12 | 2,1 | 7 | N(3) | W(2) | 2(10) | DEC | NO | 1,1 | |
| 13 | 1,1 | 9 | W(2) | W(2) | 2(10) | DEC | NO | 0,1 | |
| 14 | 0,1 | 0 | W(2) | N(3) | 3(11) | NO | DEC | 0,0 | |
| 15 | 0,0 | A | N(3) | E(0) | 0(00) | INC | NO | 1,0 | |
| 16 | 1,0 | 9 | E(0) | E(0) | 0(00) | INC | NO | 2,0 | |
| 17 | 2,0 | 9 | E(0) | E(0) | 0(00) | INC | NO | 3,0 | |
| 18 | 3,0 | 7 | E(0) | S(1) | 1(01) | NO | INC | 3,1 | EXIT POINT |

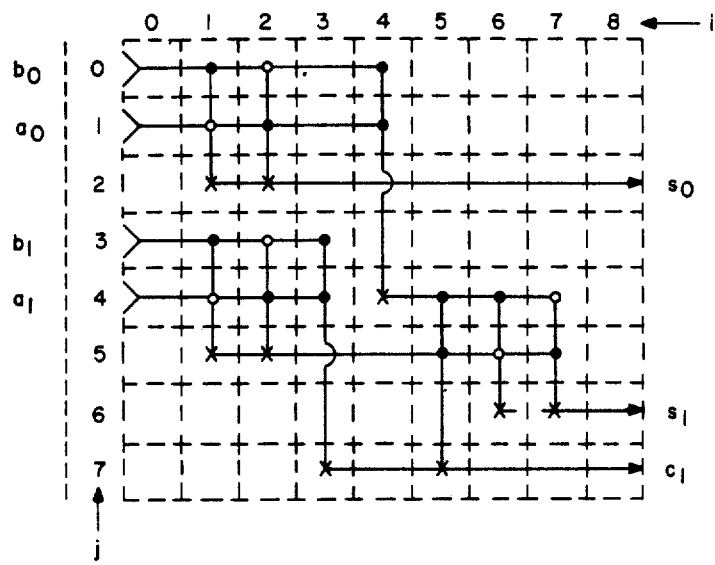

FIG. 5B

| SYMBOL ID | ELEMENT SYMBOL | OUTPUT SIGNALS | SYMBOL ID | ELEMENT SYMBOL | OUTPUT SIGNALS |
|---|---|---|---|---|---|
| 0 | ⊱ | $H_{RT}$ = INPUT SIGNAL<br>$N_{LW}$ = 0 | 9 | ⊤ | $H_{RT} = H_{LT}$<br>$V_{LW} = \overline{H_{RT}}$ |
| 1 | → | OUTPUT SIGNAL = $H_{LT}$<br>$V_{LW} = 0$ | A | ✚ | $H_{RT} = H_{LT}$<br>$V_{LW} = \overline{H_{LT}}$ AND $V_{UP}$ |
| 2 | — | $H_{RT} = H_{LT}$<br>$V_{LW} = 0$ | B | ⊥ | $H_{RT} = V_{UP}$<br>$V_{LW} = 0$ |
| 3 | \| | $V_{LW} = V_{UP}$<br>$H_{RT} = 0$ | C | ✱ | $H_{RT} = H_{LT}$ OR $V_{UP}$<br>$V_{LW} = 0$ |
| 4 | ⌐ | $H_{RT} = H_{LT}$<br>$V_{LW} = V_{UP}$ | | | |
| 5 | ⊢ | $H_{RT} = H_{LT}$<br>$V_{LW} = H_{LT}$ | | | |
| 6 | ✚ | $H_{RT} = H_{LT}$<br>$V_{LW} = V_{UP}$ AND $H_{LT}$ | | | |
| 7 | ⊣ | $V_{LW} = H_{LT}$<br>$H_{RT} = 0$ | | | |
| 8 | ⊣ | $V_{LW} = H_{LT}$ AND $V_{UP}$<br>$H_{RT} = 0$ | | | |

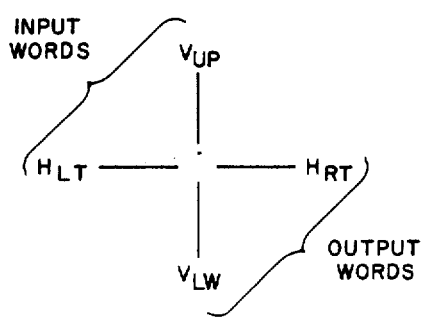

| ELEMENT SYMBOL | OUTPUT SIGNALS |
|---|---|
| ✥ | $H_{RT} = H_{LT}$<br>$V_{LW} = H_{LT}$ EX-OR $V_{UP}$ |
| ✦ | $H_{RT} = H_{LT}$<br>$V_{LW} = H_{LT}$ |

| R2(1:0) | STACK FTN |
|---|---|
| 0 | NOP |
| 1 | PUSH |
| 2 | POP·WRITE |
| 3 | POP |

| RI (2:0) | ALU FTN |
|---|---|
| 0 | $Y_0 \leftarrow Y$ |
| 1 | $Y_0 \leftarrow \overline{Y}$ |
| 2 | $Y_0 \leftarrow B$ |
| 3 | $Y_0 \leftarrow Y \cdot B$ |
| 4 | $Y_0 \leftarrow Y \cdot \overline{B}$ |
| 5 | $Y_0 \leftarrow Y + B$ |
| 6 | $Y_0 \leftarrow Y + \overline{B}$ |
| 7 | $Y_0 \leftarrow Y \oplus B$ |

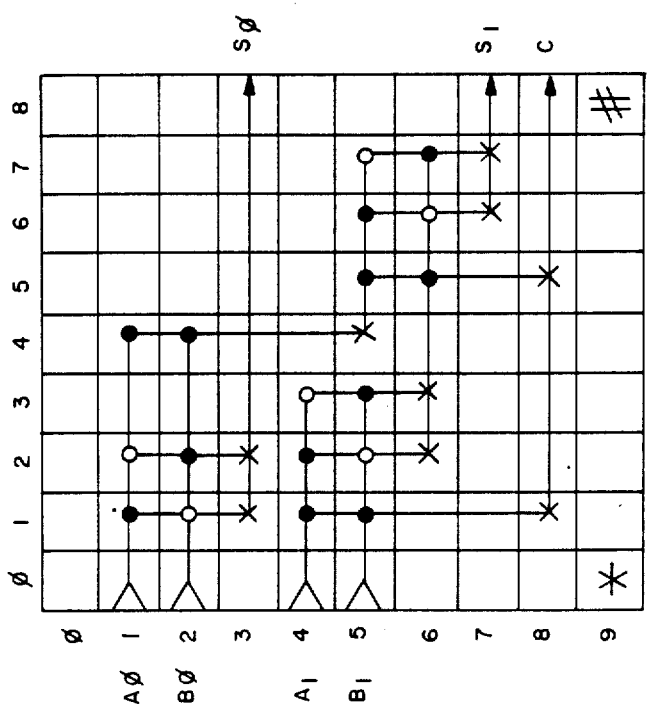

SYMBOL MEMORY

|   | 0 | 1 | 2 | 3 | 4 | 5 | 6 | 7 | 8 |
|---|---|---|---|---|---|---|---|---|---|
| 0 | z |   |   |   |   |   |   |   | z |
| 1 | X | A | C | H | A | z |   |   | z |
| 2 | X | D | B | H | B | z |   |   | z |
| 3 | z | E | F | H | K | H | H | H | Y |
| 4 | X | A | A | C | V | z |   |   | z |
| 5 | X | B | D | B | E | A | A | C | z |
| 6 | z | V | E | F | H | B | D | B | z |
| 7 | z | V |   |   |   | V | E | F | Y |
| 8 | z | E | H | H | H | F | H | H | Y |
| 9 | G |   |   |   |   |   |   |   | S |

FIG. 9C

DATA MEMORY

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 | 1 |   |   |   |   |   |   |   |   |
| 2 | 1 | (1) | (0) |   | (1) |   |   |   |   |
| 3 |   |   | (0) |   |   |   |   |   | (0) |
| 4 | 0 |   |   |   |   |   |   |   |   |
| 5 | 1 | (0) | (0) | (1) |   |   |   |   |   |
| 6 |   |   |   |   |   | (1) | (1) |   |   |
| 7 |   |   |   |   |   |   | (0) | (0) | (0) |
| 8 |   |   |   |   |   | (0) |   |   | (1) |
| 9 |   |   |   |   |   |   |   |   |   |

FIG. 9D

| ITER-ATION | CLK MEMORY ADDRESS | | SM DO CLK∅ | DM DO CLK∅ | CLK1 | | | CLK 2B, CLK 2C STACK | | | | | | ALU OUT CLK 3 | DM DI CLK 2A |
|---|---|---|---|---|---|---|---|---|---|---|---|---|---|---|---|
| | | | | | F | S | M | TOP | | NO. 2 | | NO. 1 | | | |
| | C | R | | | $R_2$ | $R_1$ | N | ADRS | D | ADRS | D | ADRS | D | | |
| 1 | ∅ | ∅ | Z | X | ∅ | ∅ | 1 | | | | | | | X | |
| 2 | ∅ | 1 | X | 1 | 1 | 2 | ∅ | ∅ 1 | X | | | | | 1 | |
| 3 | 1 | 1 | A | X | 1 | ∅ | 1 | 1 1 | 1 | ∅ 1 | X | | | 1 | |
| 4 | 1 | 2 | D | X | 2 | ∅ | ∅ | ∅ 1 | X | | | | | 1 | 1 |
| 5 | 2 | 1 | C | X | 1 | 1 | 1 | 2 1 | 1 | ∅ 1 | X | | | ∅ | |
| 6 | 2 | 2 | B | X | 2 | ∅ | ∅ | ∅ 1 | X | | | | | 1 | ∅ |
| 7 | 3 | 1 | H | X | ∅ | ∅ | ∅ | ∅ 1 | X | | | | | 1 | |
| 8 | 4 | 1 | A | X | 1 | ∅ | 1 | 4 1 | 1 | ∅ 1 | X | | | 1 | |
| 9 | 4 | 2 | B | X | 2 | ∅ | ∅ | ∅ 1 | X | | | | | 1 | 1 |
| 10 | 5 | 1 | Z | X | 3 | ∅ | 4 | | | | | | | 1 | |
| 11 | ∅ | 1 | X | 1 | ∅ | ∅ | 1 | | | | | | | 1 | |
| 12 | ∅ | 2 | X | 1 | 1 | 2 | ∅ | ∅ 2 | 1 | | | | | 1 | |
| 13 | 1 | 2 | D | 1 | 1 | 4 | 1 | 1 2 | 1 | ∅ 2 | 1 | | | ∅ | |
| 14 | 1 | 3 | E | X | ∅ | ∅ | ∅ | 1 2 | 1 | ∅ 2 | 1 | | | ∅ | |
| 15 | 2 | 3 | F | X | 2 | ∅ | ∅ | ∅ 2 | 1 | | | | | 1 | ∅ |
| 16 | 2 | 2 | B | 1 | 1 | 3 | 1 | 2 2 | 1 | ∅ 2 | 1 | | | 1 | |
| 17 | 2 | 3 | F | X | ∅ | 5 | ∅ | 2 2 | 1 | ∅ 2 | 1 | | | 1 | |
| 18 | 3 | 3 | H | X | ∅ | ∅ | ∅ | 2 2 | 1 | ∅ 2 | 1 | | | 1 | |
| 19 | 4 | 3 | K | X | ∅ | ∅ | ∅ | 2 2 | 1 | ∅ 2 | 1 | | | 1 | |

FIG. 9E-1

| ITER-ATION | CLK 3 MEMORY ADDRESS ||SM DO CLK0 | DM DO CLK0 | CLK 1 |||CLK 2B, CLK 2C STACK ||||||ALU OUT CLK 3 | DM DI CLK 2A |
|---|---|---|---|---|---|---|---|---|---|---|---|---|---|---|---|
| | | | | | F | S | M | TOP || NO.2 || NO.3 || | |
| | C | R | | | R2 | R1 | N | ADRS | D | ADRS | D | ADRS | D | | |
| 20 | 5 | 3 | H | X | 0 | 0 | 0 | 22 | 1 | 02 | 1 | | | 1 | |
| 21 | 6 | 3 | H | X | 0 | 0 | 0 | 22 | 1 | 02 | 1 | | | 1 | |
| 22 | 7 | 3 | H | X | 0 | 0 | 0 | 22 | 1 | 02 | 1 | | | 1 | |
| 23 | 8 | 3 | Y | X | 2 | 0 | 4 | 02 | 1 | | | | | 1 | 1 |
| 24 | 2 | 2 | B | X | 0 | 0 | 0 | 02 | 1 | | | | | 1 | |
| 25 | 3 | 2 | H | X | 0 | 0 | 0 | 02 | 1 | | | | | 1 | |
| 26 | 4 | 2 | B | 1 | 1 | 3 | 1 | 42 | 1 | 02 | 1 | | | 1 | |
| 27 | 4 | 3 | K | X | 0 | 0 | 1 | 42 | 1 | 02 | 1 | | | 1 | |
| 28 | 4 | 4 | V | X | 0 | 0 | 1 | 42 | 1 | 02 | 1 | | | 1 | |
| 29 | 4 | 5 | E | X | 0 | 0 | 0 | 42 | 1 | 02 | 1 | | | 1 | |
| 30 | 5 | 5 | A | X | 1 | 0 | 1 | 55 | 1 | 42 | 1 | 02 | 1 | 1 | |
| 31 | 5 | 6 | B | X | 2 | 0 | 0 | 42 | 1 | 02 | 1 | | | 1 | 1 |
| 32 | 6 | 5 | A | X | 1 | 0 | 1 | 65 | 1 | 42 | 1 | 02 | 1 | 1 | |
| 33 | 6 | 6 | D | X | 2 | 0 | 0 | 42 | 1 | 02 | 1 | | | 1 | 1 |
| 34 | 7 | 5 | C | X | 1 | 1 | 1 | 75 | 1 | 42 | 1 | 02 | 1 | 0 | |
| 35 | 7 | 6 | B | X | 2 | 0 | 0 | 42 | 1 | 02 | 1 | | | 1 | 0 |
| 36 | 8 | 5 | Z | X | 3 | 0 | 4 | 02 | 1 | | | | | 1 | |
| 37 | 4 | 2 | B | X | 0 | 0 | 0 | 02 | 1 | | | | | 1 | |
| 38 | 5 | 2 | Z | X | 3 | 0 | 4 | | | | | | | 1 | |

FIG. 9E-2

| ITER-ATION | CLK MEMORY ADDRESS | | SM DO CLK Ø | DM DO CLK Ø | CLK1 | | | CLK 2B, CLK 2C STACK | | | | | | ALU OUT CLK 3 | DM DI CLK2A |
|---|---|---|---|---|---|---|---|---|---|---|---|---|---|---|---|
| | | | | | F | S | M | TOP | | NO. 2 | | NO. 3 | | | |
| | C | R | | | $R_2$ | $R_1$ | N | ADRS | D | ADRS | D | ADRS | D | | |
| 39 | Ø | 2 | X | 1 | Ø | Ø | 1 | | | | | | | 1 | |
| 40 | Ø | 3 | Z | X | Ø | Ø | 1 | | | | | | | 1 | |
| 41 | Ø | 4 | X | Ø | 1 | 2 | Ø | Ø4 | 1 | | | | | Ø | |
| 42 | 1 | 4 | A | X | 1 | Ø | 1 | 14 | Ø | Ø4 | 1 | | | Ø | |
| 43 | 1 | 5 | B | X | 2 | Ø | Ø | Ø4 | 1 | | | | | Ø | Ø |
| 44 | 2 | 4 | A | X | 1 | Ø | 1 | 24 | Ø | Ø4 | 1 | | | Ø | |
| 45 | 2 | 5 | D | X | 2 | Ø | Ø | Ø4 | 1 | | | | | Ø | Ø |
| 46 | 3 | 4 | C | X | 1 | 1 | 1 | 34 | Ø | Ø4 | 1 | | | 1 | |
| 47 | 3 | 5 | B | X | 2 | Ø | Ø | Ø4 | 1 | | | | | Ø | 1 |
| 48 | 4 | 4 | V | X | 3 | Ø | 4 | | | | | | | Ø | |
| 49 | Ø | 4 | X | Ø | Ø | Ø | 1 | | | | | | | Ø | |
| 50 | Ø | 5 | X | 1 | 1 | 2 | Ø | Ø5 | Ø | | | | | 1 | |
| 51 | 1 | 5 | B | Ø | 1 | 3 | 1 | 15 | 1 | Ø5 | Ø | | | Ø | |
| 52 | 1 | 6 | V | X | Ø | Ø | 1 | 15 | 1 | Ø5 | Ø | | | Ø | |
| 53 | 1 | 7 | V | X | Ø | Ø | 1 | 15 | 1 | Ø5 | Ø | | | Ø | |
| 54 | 1 | 8 | E | X | Ø | Ø | Ø | 15 | 1 | Ø5 | Ø | | | Ø | |
| 55 | 2 | 8 | H | X | Ø | Ø | Ø | 15 | 1 | Ø5 | Ø | | | Ø | |
| 56 | 3 | 8 | H | X | Ø | Ø | Ø | 15 | 1 | Ø5 | Ø | | | Ø | |
| 57 | 4 | 8 | H | X | Ø | Ø | Ø | 15 | 1 | Ø5 | Ø | | | Ø | |

FIG. 9E-3

| ITER-ATION | CLK 3 MEMORY ADDRESS | | SM DO CLK0 | DM DO CLK0 | CLK 1 | | | CLK 2B, CLK 2C STACK | | | | | | ALU OUT CLK 3 | DM DI CLK 2A |
|---|---|---|---|---|---|---|---|---|---|---|---|---|---|---|---|
| | C | R | | | F R2 | S R1 | M N | TOP ADRS | D | #2 ADRS | D | #3 ADRS | D | | |
| 58 | 5 | 8 | F | X | 2 | 0 | 0 | 05 | 0 | | | | | 1 | 0 |
| 59 | 2 | 5 | D | 0 | 1 | 4 | 1 | 05 | 0 | | | | | 1 | |
| 60 | 2 | 6 | E | X | 0 | 0 | 0 | 25 | 1 | 05 | 0 | | | 1 | |
| 61 | 3 | 6 | F | X | 2 | 0 | 0 | 25 | 1 | 05 | 0 | | | 1 | 1 |
| 62 | 3 | 5 | B | 1 | 1 | 3 | 1 | 05 | 0 | | | | | 1 | |
| 63 | 3 | 6 | F | 1 | 0 | 5 | 0 | 35 | 1 | 05 | 0 | | | 1 | |
| 64 | 4 | 6 | H | X | 0 | 0 | 0 | 35 | 1 | 05 | 0 | | | 1 | |
| 65 | 5 | 6 | B | 1 | 1 | 3 | 1 | 56 | 1 | 35 | 1 | 05 | 0 | 1 | |
| 66 | 5 | 7 | V | X | 0 | 0 | 1 | 56 | 1 | 35 | 1 | 05 | 0 | 1 | |
| 67 | 5 | 8 | F | 0 | 0 | 5 | 0 | 56 | 1 | 35 | 1 | 05 | 0 | 1 | |
| 68 | 6 | 8 | H | X | 0 | 0 | 0 | 56 | 1 | 35 | 1 | 05 | 0 | 1 | |
| 69 | 7 | 8 | H | X | 0 | 0 | 0 | 56 | 1 | 35 | 1 | 05 | 0 | 1 | |
| 70 | 8 | 8 | Y | X | 2 | 0 | 4 | 35 | 1 | 05 | 0 | | | 1 | 1 |
| 71 | 5 | 6 | B | 1 | 0 | 0 | 0 | 35 | 1 | 05 | 0 | | | 1 | |
| 72 | 6 | 6 | D | 1 | 1 | 4 | 1 | 66 | 1 | 35 | 1 | 05 | 0 | 0 | |
| 73 | 6 | 7 | E | X | 0 | 0 | 0 | 66 | 1 | 35 | 1 | 05 | 0 | 0 | |
| 74 | 7 | 7 | F | X | 2 | 0 | 0 | 35 | 1 | 05 | 0 | | | 1 | 0 |
| 75 | 7 | 6 | B | 0 | 1 | 3 | 1 | 35 | 1 | 05 | 0 | | | 1 | |
| 76 | 7 | 7 | F | 0 | 0 | 5 | 0 | 76 | 1 | 35 | 1 | 05 | 0 | 0 | |

FIG. 9E-4

| ITER-ATION | CLK 3 MEMORY ADDRESS | | SM DO | DM DO | CLK 1 | | | CLK 2B, CLK 2C STACK | | | | | | ALU OUT | DM PI |
|---|---|---|---|---|---|---|---|---|---|---|---|---|---|---|---|
| | | | | | F | S | M | TOP | | #2 | | #3 | | | |
| | C | R | CLK 0 | CLK 0 | $R_2$ | $R_1$ | N | ADRS | D | ADRS | D | ADRS | D | CLK 3 | CLK 2A |
| 77 | 8 | 7 | Y | X | 2 | 0 | 4 | 35 | 1 | 05 | 0 | | | 1 | 0 |
| 78 | 7 | 6 | B | X | 0 | 0 | 0 | 35 | 1 | 05 | 0 | | | 1 | |
| 79 | 8 | 6 | Z | X | 3 | 0 | 4 | 05 | 0 | | | | | 1 | |
| 80 | 3 | 5 | B | 1 | 0 | 0 | 0 | 05 | 0 | | | | | 1 | |
| 81 | 4 | 5 | E | X | 3 | 0 | 4 | | | | | | | 0 | |
| 82 | 0 | 5 | X | 1 | 0 | 0 | 1 | | | | | | | 1 | |
| 83 | 0 | 6 | Z | X | 0 | 0 | 1 | | | | | | | | |
| 84 | 0 | 7 | Z | X | 0 | 0 | 1 | | | | | | | | |
| 85 | 0 | 8 | Z | X | 0 | 0 | 1 | | | | | | | | |
| 86 | 0 | 9 | G | X | 3 | 0 | 1 | | | | | | | | |
| 87 | 8 | 1 | Z | X | 0 | 0 | 1 | | | | | | | | |
| 88 | 8 | 2 | Z | X | 0 | 0 | 1 | | | | | | | | |
| 89 | 8 | 3 | Y | 0 | 0 | 8 | 1 | | | | | | | | |
| 90 | 8 | 4 | Z | X | 0 | 0 | 1 | | | | | | | | |
| 91 | 8 | 5 | Z | X | 0 | 0 | 1 | | | | | | | | |
| 92 | 8 | 6 | Z | X | 0 | 0 | 1 | | | | | | | | |
| 93 | 8 | 7 | Y | 0 | 0 | 8 | 1 | | | | | | | | |
| 94 | 8 | 8 | Y | 1 | 0 | 8 | 1 | | | | | | | | |
| 95 | 8 | 9 | S | X | 0 | 0 | 4 | | | | | | | | |

SIMULATION APPARATUS AND METHOD

BACKGROUND OF THE INVENTION

1. Field of the Invention

The invention relates to method and apparatus for simulating systems that are configured in the form of networks of arranged processing elements. For example, the invention may be used to assist in the design of a digital logic network comprising a plurality of digital logic circuits, and determine the output signals that would be developed by the network in response to the digital input signals. The simulation apparatus constructed in accordance with the invention may thus be used to verify the logical operations performed by the network before the network is actually constructed.

The invention also finds wide utility in a number of other fields in which systems can be analyzed in the form of trees or networks, including the design and verification of processing networks, pipe and electric and telephone wire networks, road networks and floor plans. Furthermore, the invention will find utility in such fields as image processing and image analysis, in which an image can be divided into a number of picture elements, or "pixels", and the pixels analyzed in relation to their neighbors. The invention will further find utility in the design and verification of non-digital electronic circuits.

2. Description of the Prior Art

In the past, the logical operation of electronic networks has been verified by constructing a prototype of the network on a "breadboard", and connecting appropriate test equipment. An input signal is then applied to the inputs of the network, the output signal generated by the network is sensed, and the actual output signal is compared to the desired output signal to determine if they are identical. The process of applying the input signal and sensing the output signal must be repeated for every possible input signal to completely verify the circuit design. For some circuitry, for example a three-to-eight digital decoder, in which one of eight output lines is energized in response to a selected encoding of the three input lines, only eight different sets of three input signals are required to test the circuit. However, for a sixteen-bit adder, which generates sum and carry signals in response to two sixteen-bit input words, in excess of one hundred thousand possible combinations of the input signals are possible. It is apparent that verification of a breadboard prototype of such a circuit by this method is an extremely lengthy process, if it were desired to test the circuit with all possible combinations of input signals.

The process of verifying the design of other networks can also be a lengthy task. Piping, wire for electrical power and telephone networks, roadways and floor plans normally cannot be breadboarded, and therefore the design must be verified from the plans and testing in the field. This can be expensive if a design error must be corrected.

Furthermore, image processing and analysis, including enhancement of faint images and recognition of various shapes, can be a lengthy process if done manually. A number of computer algorithms have been written to attempt to automate the process of image recognition, but to date these have been fairly slow.

Copending application no. 698,474, assigned to the assignee of the present inventions, discloses a simulator that simulates a network of an array of processing elements by determining the output signals that would be present at the output terminals in response to a set of input signals provided by an operator at the input terminals. The network is formed from a predetermined set of processing elements, each element in the set having predetermined input and output terminals and performing a predefined logical operation on input signals present at the input terminals, the output signals at the output terminals of each element being determined by the input signals and the logical operation defined therefor.

In the aforementioned simulator, each type of processing element is represented by a code representation that is stored in a symbol memory. The symbol memory includes a plurality of storage locations having row and column addresses which correspond to the rows and columns of the network array. Each storage location stores the representations of the processing element at the corresponding location in the network array. The simulator also includes a data memory which also includes storage locations having row and column addresses which correspond to the rows and columns in the network array, and a separate register. The simulator simulates the network in a series of iterations. During each iteration, the simulator determines the type of processing element that is present in a location in the array and retrieves input data representative of the input signals which would be present in the network, which data is obtained from the data memory and register. The simulator then determines the output signals which would be generated by the processing element and stores data representative of the output signals in the data memory and register.

The simulator described in the aforementioned application processes the processing elements in each row, from left to right, and from the top row to the bottom in the array. Thus, the network is constrained to have its input terminals at the left and upper portions of the array, and the outputs to the right and lower portions. In such a system, the processing elements must have inputs from the left and above and outputs to the right and down. Furthermore, since the simulator steps through all of the rows and columns in the array, it will process some locations at which no network elements are located, which wastes time in the simulator.

SUMMARY OF THE INVENTION

The invention provides an improvement over the simulator described in the aforementioned application Ser. No. 698,474 which allows the simulator to step in any direction through the array and to avoid most blank areas in the array. Specifically, the invention provides that the simulator steps through the array and proceeds to the next processing element based on the type of processing element being processed.

Specifically, the invention provides a simulation engine which simulates networks comprising logic elements which perform processing operations on inputs and determines the outputs that would be generated by the network, with the logical operation to be performed by each element depending on the direction from which the element is approached in the network as well as the type of element. The logic elements forming the network are arranged in rows and columns. The engine includes a symbol memory which stores logic symbols each representing a logic element of the network in storage locations arranged in an array pattern of rows and columns. Each different type of symbol represents one of a predetermined set of defined logic elements. A data memory and a stack provide storage locations for intermediate results of the simulation. The data memory has storage locations arranged in a row and column correspondence to the storage locations of the symbol memory. An arithmetic and logic unit (ALU) module receives the contents of selected storage locations from the data memory and stack and generates and stores results in an intermediate storage register.

The engine is controlled by control signals from a finite state machine, which iteratively generates control signals in response to the type of logic element present at each location, and the direction in the network from which the element is approached. An address computation unit also controlled by the finite state machine provides the row and column addresses which are coupled to the symbol and data memories and stack. The control signals from the finite state machine control the stack, address computation unit and ALU module in response to the type of logic element present at the location being specified by the address computation unit and the direction in the network from which the logic element is being approached during the simulation, thereby to simulate the processing which would be performed by that element in an actual network.

In operation, an operator stores input data at the locations in the data memory corresponding to the locations in the symbol memory which store logic element symbols representing network input terminals. The simulation engine begins at an input element, and the finite state machine forces the input data from the data memory into the intermediate storage register. From the input, the finite state machine enables the address computation unit to step across the network element by element, the ALU module generating and storing, in the intermediate storage register, data representative of the responses of the logic elements to the input signal or signals.

When a logic element is reached which has two output directions, a branch occurs, in which the address of the element provided by the address computation unit and the data in the internal storage in the ALU module are then pushed onto the stack. The address computation unit then enables the engine to proceed along one of the branches until it reaches a logic element which requires a second input data. The direction from which the logic element is approached specifies whether the second input data has been determined; in the initial approach direction, the second input data will not have been determined, and so the data generated by the ALU module is stored in the data memory at the same location as the logic element. The engine, using the information stored in the stack, then returns to the logic element at which the branch occurred to proceed along the other path of the branch.

The process continues with branch row and column addresses and response data calculated by the ALU module being pushed onto the stack when a branch is reached, and data from the ALU module being stored in the data memory when another input is required, but not available for a logic element. When a logic element is encountered for which another input data item is required, and it is being approached from a direction which indicates that the other input data item has previously been determined and is available from the data memory, the contents of the corresponding storage location of the data memory are transmitted to the ALU module as the other input value. Under control of the finite state machine, the ALU module determines the response of the logic element to both data items, and the engine then steps to the next logic element in the network. When an output element is processed, the response of the network at that point are available to the operator.

BRIEF DESCRIPTION OF THE DRAWINGS

The invention is pointed out with particularity in the appended claims. The advantages of the invention may be better understood by referring to the following description taken in conjunction with the accompanying drawings, in which:

FIG. 1 is a block diagram of a simulation engine constructed in accordance with the invention;

FIGS. 2A, 2B, and 3A through 3D are diagrams which are useful in understanding the operation of the engine depicted in FIG. 1;

FIGS. 5A-5D is a table that is useful in understanding the operation of the simulation engine depicted in FIG. 4;

FIGS. 9A through 9E-5 are diagrams which present an example of the operation of the simulation engine of FIGS. 4-8.

DESCRIPTION OF THE PREFERRED EMBODIMENTS

Figure 4:
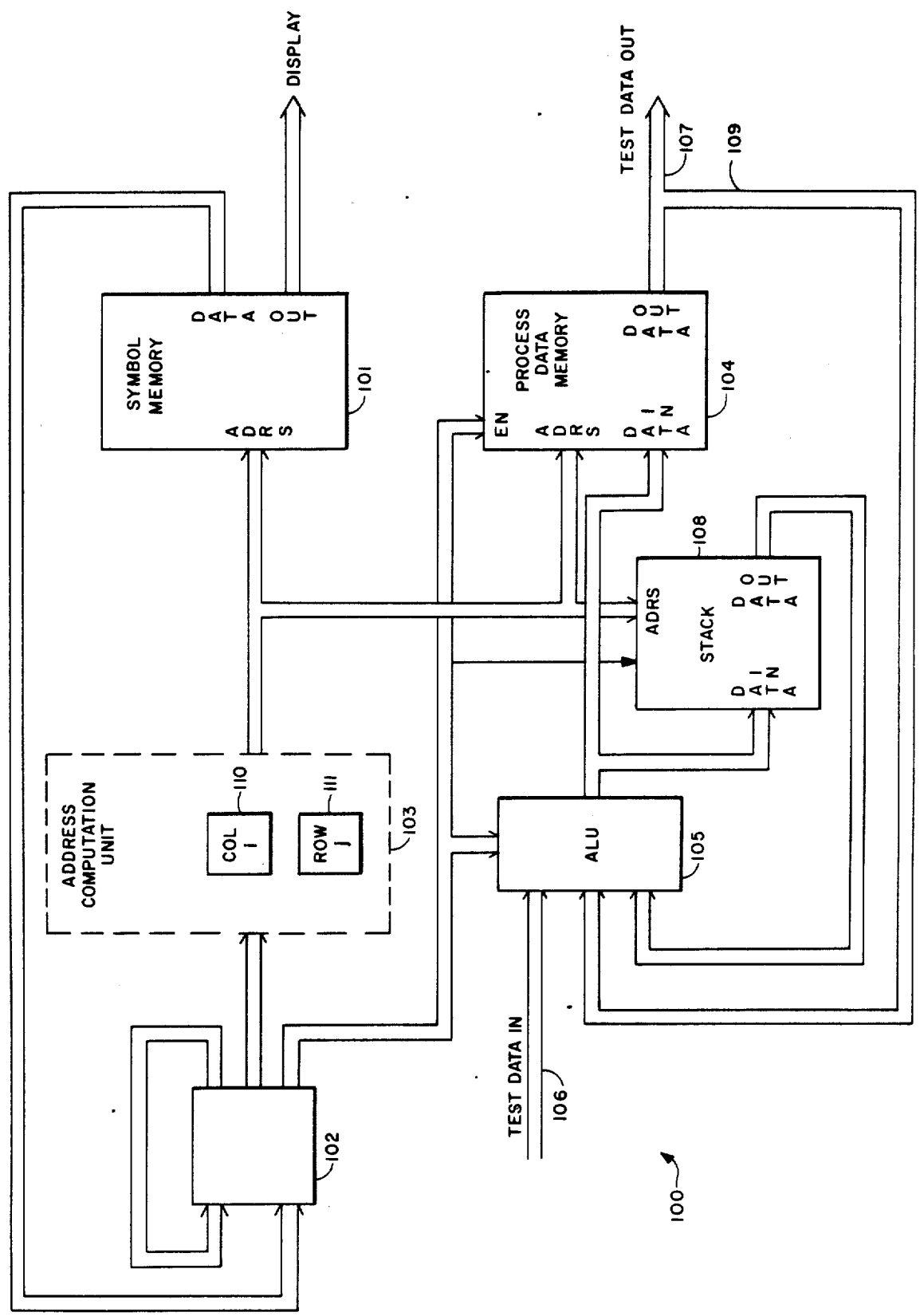
FIG. 4 is a block diagram of another embodiment of a simulation engine constructed in accordance with the invention.

FIG. 1 depicts a general block diagram of a simulation engine 10 constructed in accordance with one aspect of the invention, that is useful in simulating the traversal through a network such as a maze 12 (FIGS. 2A and 2B) from an input point to an exit point, which are indicated by openings in the outer wall of the maze. The engine 10 includes a symbol memory 11 which includes a plurality of addressable storage locations arranged in an array pattern having a selected number of rows and columns. In one embodiment, memory 11 may constitute a refresh memory for a video display terminal, and the maze may be displayed on the terminal for an operator in a known manner. Each storage location stores the identification of an element or cell, that is, a portion of the maze 12 as defined below. Maze 12 comprises sixteen cells arranged in four columns of four rows each. The columns depicted in FIGS. 2A and 2B are generally identified by the letter "i", and the rows are generally identified by the letter "j"; since the maze 12 has four rows and columns, both i and j can take on any integer value from zero to three.

The maze 12 may be formed from sixteen different types of cells, which are illustrated in the table in FIG. 3A, with each type of cell being defined by the number and placement of the walls. As shown in FIG. 3C, which depicts a memory map of symbol memory 11, the symbol memory stores the identification of each of the various types of cells forming maze 12 in storage locations having a row and column address that corresponds to the row and column address of the corresponding cell in maze 12. For example, as shown in FIG. 3A, the type of cell defined as having no walls has an "ID", or identification, of "0". With reference to FIGS. 2A and 2B, the cell in maze 12 at row "1", column "zero", also has no walls, and, as shown in FIG. 3C, the symbol memory 11, at that storage location, stores the value "zero". Similarly, the cell having the ID of "one" (FIG. 3A) is defined as having only a righthand wall. The cell in maze 12 at row 2, column 2 (FIGS. 2A and 2B) has only a righthand wall, and the corresponding location in symbol memory 11 (see FIG. 3C) stores the value "1". The remaining locations in symbol memory 11, as shown in FIG. 3C, contain values that are determined in the same way.

The symbol memory 11 is addressed by an address computation unit 13 which includes a row counter 14 and a column counter 15. The row counter generates row address signals, and the column counter 15 generates column address signals. Both the row and column address signals are coupled to the address inputs of the symbol memory. The counters 14 and 15 are individually enabled to increment or decrement by a finite state machine 16. A finite state machine is, generally, a synchronous device a portion of whose output signals during each step are fed back to provide input signals which determine, in part, the output signals that are generated at the next step. The output signals generated by the finite state machine 16 are also generated partially in response to the type of the cell at the location addressed by the address computation unit 13, which is transmitted by the symbol memory 11 to input terminals of finite state machine 16 over line 21. Since the output signals from the finite state machine control the counters of the address computation unit 13, they represent direction (up, down, right, or left) of travel from one cell to the next in the maze.

The direction of travel through the maze is also determined in part by the type of cell located at that point and in part by the particular "turn strategy" employed during traversal of the maze. As noted above, the type of cell is reflective of the number and placement of walls and thus determines the directions from which a cell, once entered, may be exitted. The turn strategy determines the preferred exit direction when a cell may be exitted in more than one direction. A turn strategy used in connection with maze 12 states that (in order of decreasing preference):

(a) after entering a cell, exit to the right (in a right turn strategy) or to the left (in a left turn strategy) of the direction of entry into the cell; otherwise,
 (b) after entering a cell, continue straight ahead; otherwise,
 (c) after entering a cell, exit left (in a right turn strategy), or right (in a left turn strategy) of the direction of entry into the cell; otherwise,
 (d) reverse direction.

The table depicted in FIG. 3A illustrates the desired exit directions for each entry direction, for each type of cell, for the right and left turn strategies. The directions represented by the numbers in the "turn strategy" columns in the table in FIG. 3A are identified with respect to a direction pointer 20 illustrated in FIG. 3B. Each direction is identified by a number, with "0" identifying an easterly direction, a "1" identifying a southerly direction, a "2" identifying a westerly direction, and a "3" identifying a northerly direction.

The numbers identifying the directions associated with the direction pointer 20 (FIG. 3B) represent the binary-encoded values of the output signals from the finite state machine 16 which control address computation unit 13. These values were established as follows. If a cell is entered going in an easterly direction, that is, if the cell is enterred from the left, in a right turn strategy the most preferred exit direction is towards the south. If the cell does not have a wall blocking egress in that direction, the finite state machine 16 transmits signals having the binary-encoded value "1" indicating the southerly direction as shown by direction pointer 20 (FIG. 3B). In transmitting output signals having the value "1", the finite state machine energizes one of output lines 22 to assert an LSB (less significant bit) signal and maintains the other line at a de-energized level to negate an MSB (more significant bit) signal. As can be seen from FIG. 1, in this condition, the column counter is unchanged and the row counter is incremented, causing the cell to be exitted in a southerly direction.

However, if the cell is entered while going in a southerly direction (that is, if the cell is enterred from above or from the north), the desired exit direction is in a westerly direction. Again, if the cell does not have a wall blocking egress in that direction, in a right turn strategy, the finite state machine transmits signals having a binary encoded value "2", indicating the westerly direction, as shown by direction pointer 20 (FIG. 3B). To transmit output signals having the binary-encoded value "2", the finite state machine energizes one of the output lines 22 to assert the MSB signal and maintains the other line in a de-energized state to negate the LSB signal. As can be seen from FIG. 1, in this condition, the column counter is enabled to decrement and the row counter is unchanged, causing the cell to be exitted in a westerly direction.

The digits representing the northerly and easterly directions were selected to enable the column and row counters to increment or decrement in the same way, to achieve the desired egress directions.

The remainder of the exit directions depicted in FIG. 3A, for both the left and right turn strategies, were established in the same manner. As is evident, some entry directions cannot be encountered because of the placement of a wall. These entry directions are indicated in FIG. 3A by dashes. Furthermore, the placement of a wall may prevent exit in the most preferred direction for a selected turn strategy. In such a case, the exit direction is the most preferred direction which can be taken for the turn strategy.

The finite state machine 16 is a read-only memory which has a plurality of storage locations, and an output register which latches the contents of the addressed storage location in response to a CLK timing signal. The CLK timing signal also enables the counters 14 and 15 of address computation unit 13 to generate new address signals for the symbol memory. The output signals on lines 22 comprise low-order address signals and the signals on lines 21 comprise high-order address signals which identify the storage locations of the read-only memory. The storage locations contain the values depicted in the table in FIG. 3A in either the right or left turn strategy columns. Specifically, the storage location having the address (00), which corresponds to the cell with ID equal to "zero", and enterred from the easterly direction, has the value "1" for a right turn strategy, and "3" for a left turn strategy. The read-only memory can store both values for both the left and right turn strategies if an additional address signal is provided (not shown) to select between storage locations for the two strategies.

With this background, the operation of the engine depicted in FIG. 1 will be described. After the operator has identified the beginning of the maze, which is selected to be the cell having the column and row address (i,j)=(0,1) in the example depicted in FIGS. 2A and 2B, the simulation engine 10 will traverse through the maze according to the selected right or left turn strategy. FIG. 3D contains a table detailing the steps performed by simulation engine 10 in traversing through the maze 12 using the right turn strategy, which is graphically depicted in FIG. 2A. The steps that would be performed using the left turn strategy are similar to steps 15 through 18 of FIG. 3D, and are shown graphically in FIG. 2B. The progress of engine 10 in stepping through the maze can also be displayed on a video display terminal, in a known manner, by using the address inputs to memory 11 to project a spot on the operator's display (not shown), the address signals identifying the most recently accessed cell in maze 12.

FIG. 4 illustrates a simulation engine 100 that is useful in simulating the operations of more complex networks, and specifically to process input data provided by an operator and generate output data in response thereto, the output data being representative of output signals which would be generated by the network in response to input signals represented by the input data.

The engine simulates networks of elements that process inputs, that is, that receive one or more input signals from a like number of input lines or directions, perform a processing operation on the inputs, and transmit one or more outputs onto a like number of output lines or directions. The network elements are arranged in columns and rows like the cells of the maze depicted in FIGS. 2A and 2B. In brief, the engine 100, in a series of iterations, processes the elements in the network from the network input terminals to the network output terminals. The type of element at each iteration determines (1) the processing of the element's inputs obtained from previously processed, that is, upstream, elements, and (2) the direction in the network to the element to be processed in the next iteration. When all of the elements have been processed, the responses of the networks to the inputs are available at the network output terminals.

The simulation engine 100 includes a symbol memory 101, a finite state machine 102 and an address computation unit 103. The symbol memory 101, like symbol memory 11 (FIG. 1), stores, at each addressable storage location, the identification of one element of the network being simulated. Like the cells of the maze 12 depicted in FIGS. 2A and 2B, the elements comprising a network are stored in an array pattern having a selected number of columns and rows. The storage locations in the symbol memory 101 are similarly arranged in rows and columns, and each location stores the identification of the network element at the corresponding location in the network. Like memory 11, memory 101 may be a refresh memory for a display terminal and the network may thus be displayed for an operator.

The address computation unit generates an address that identifies a location in the symbol memory whose contents are transmitted to the finite state machine 102. In addition to transmitting addresses to the symbol memory 101, the address computation unit 103 also transmits an address to a process data memory 104. The process data memory stores, at each location, initial input data that correspond to input signals for the network under simulation, as well as certain process data that is generated by an arithmetic logic unit (ALU) module 105. The ALU module is also connected to the finite state machine 102 and to a data output (DO) terminal of process data memory 104, which supplies process data to the ALU module.

A stack 106 is provided to store intermediate data and addresses when a branch is encountered in a network. A branch occurs when the simulation engine encounters an element from which two exit directions are permitted. The address of the element at which a branch occurs, as well as process data from the ALU module, are stored on the top of the stack. When one path of the branch has been stepped through, the result is stored in process data memory 104, and the simulation engine returns to the network element at which it last branched by retrieving, under control of the finite state machine, the data and address stored at the top of the stack. Along with a POP OUT signal, the address is loaded in the address computation unit, which replaces the prior address with the address from the stack, and the data is coupled to an input terminal of ALU module 105.

The finite state machine 102 generates three sets of control signals. Control signals R1(3:0) enable the ALU module 105 to process the data from the process data memory 104 and stack 108 as required by the type of the element being processed, and to generate one or more output words that are stored in the corresponding location in the stack or process data memory. Control signals R2(1:0) control the operations of stack 108, and control signals N(2:0) control address generation by address computation unit 103. The combination of the N(2:0) control signals and the signals from symbol memory 101 together control the control signals transmitted by the finite state machine 102 for the next iteration.

Like finite state machine 15, the finite state machine 102 includes a read only memory which stores the program of operation of the simulation engine 100 and an output register (not shown) which is loaded in response to a CK1 timing signal. The specific program depends on the nature of the network elements which may be stored in the symbol memory 101. A specific example of such a program, and of its use in simulating networks of electronic circuit elements, will be presented below in connection with FIGS. 9A through 9E-5. The output signals from the symbol memory 101 constitute high order address signals and the N(2:0) output signals from the finite state machine 102 constitute the low order address signals which together identify, during each iteration, a storage location in the finite state machine. Each location stores the necessary signals for forming the R2(1:0), R1(3:0) and N(2:0) control signals to control the simulation engine.

The address computation unit 103 is similar to address computation unit 13 (FIG. 1). It includes a column counter 110 and a row counter 111 both of which receive the N(2:0) control signals. The N(0) control signal selectively enables one of the column or row counters 110 and 111. The N(1) control signal, when asserted, enables the counter which is enabled by the N(0) signal to count down in response to the CK3 clocking signal. Finally, the N(2) control signal, when asserted, disables both counters from incrementing or decrementing.

Figure 5D:
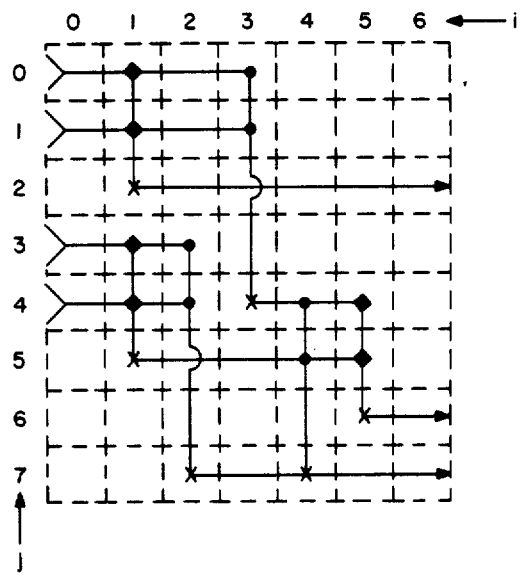

These operations are summarized in the table in FIG. 5. With the exception of the N(2) control signal, which is a disabling signal, the address computation unit 103 responds to the signals from the finite state machine in the same way as the address computation unit depicted in FIG. 1. The direction pointer 20 (FIG. 3B) thus suffices to depict the direction in a network traversed by the engine in response to the binary-encoded N(1:0) input signals from the finite state machine.

As has been mentioned, the address computation unit 103 can be forced to return to an address at which a branch occurred by appropriate signals from stack 108. The stack transmits the POP OUT signal which enables an LD "load" terminal on each of counters 110 and 111. Simultaneously, the stack 108 transmits the address onto lines 107 and 109. In response to the POP OUT signal, the counters receive and latch the address signals from the stack. The counters will thereafter increment or decrement from the address provided by the stack.

Figures 6A, 6B:
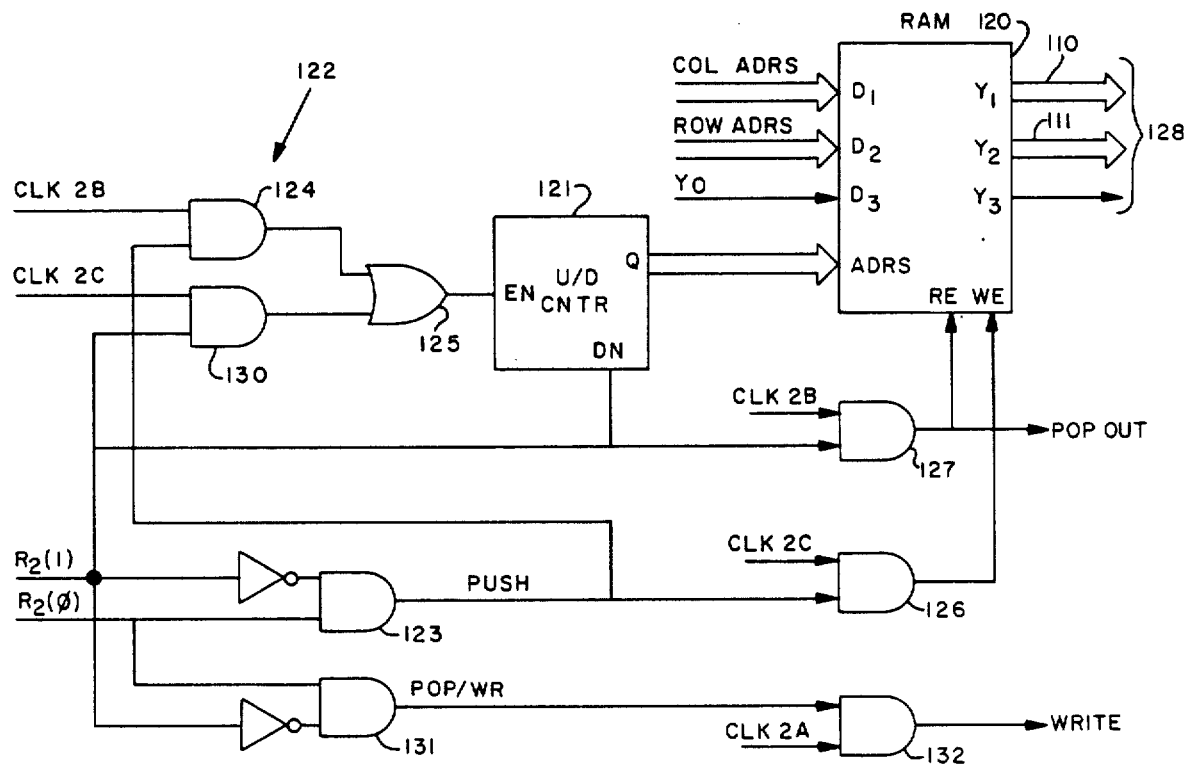
FIG. 6A is a circuit diagram of a stack which is useful in the simulation engine of FIG. 4.
FIG. 6B is a table that is useful in understanding the operation of the stack depicted in FIG. 6A.

FIG. 6A depicts a circuit diagram of a stack 107 including a random access memory 120 which stores the column and row address and the state of the output data signal Y0 from ALU module 105 through input terminals D1, D2 and D3, respectively. In the engine depicted in FIG. 4, the stack has four locations, three for storing data and addresses from ALU module 105 and address computation unit 103, and the fourth, which is at the bottom of the stack, for storing a constant. The constant is used as shown below (see discussion below regarding FIG. 9E-5). The location in memory 120 which stores the input data, or from which data are retrieved, is selected by address signals from an up/down counter 121 which, in turn, is controlled by a control network 122.

The network 122 receives binary-encoded R2(1:0) control signals which enable the stack to function as shown in the table in FIG. 6B. If both of the R2(1:0) control signals are negated, which corresponds to the R2(1:0)=0 line in the table, the stack performs no operation. However, if the R2(1) control signal is negated, and the R2(0) control signal is asserted, the stack 106 performs a PUSH operation as shown in the R2(1:0)=1 line in the table. An AND gate 123 (FIG. 6A) generates a PUSH signal which enables one input of an AND gate 124. When a CLK 2B timing signal is asserted, AND gate 124 is energized, which causes an OR gate 125 to enable the up/down counter 121 to increment. In response to a later CLK 2C timing signal, an AND gate 126 then enables memory 120 to store the address and data at the memory's D1, D2 and D3 data input terminals into the location identified by the up/down counter.

If, on the other hand, the R2(1) control signal is asserted, a POP operation is performed by the stack. This is shown in the R2(1:0)=2 and 3 lines in the table in FIG. 6B. The R2(1) control signal enables one input of AND gate 127, which enables the read enable input of memory 120 when the CLK 2B clocking signal is received. This in turn enables the memory 120 to couple the contents of the location then addressed by counter 121 to be transmitted on the output lines 128. The AND gate 127 simultaneously transmits the POP OUT signal to the address computation unit 103 and ALU module 105 of the simulation engine 100 (see FIG. 4). In response to the next CLK 2C clocking signal, AND gate 130 enables counter 121 to decrement.

If the R2(1) control signal is asserted, and the R2(0) control signal is negated, as shown in the R2(1:0) line in the table in FIG. 6B, the operation is a POP-AND-WRITE. Prior to the transmission of the contents of the location in memory 120 over lines 128, an AND gate 131 is energized to transmit a WRITE signal to data memory 104 (FIG. 4). When the CLK 2A timing signal, which precedes the CLK 2B and CLK 2C timing signals, is received, an AND gate 132 transmits a WRITE signal to data memory 104 (FIG. 4), enabling the data memory to store the Y0 data transmitted by the ALU module 105, at the location then specified by the address computation unit 103.

Figures 7A, 7B:
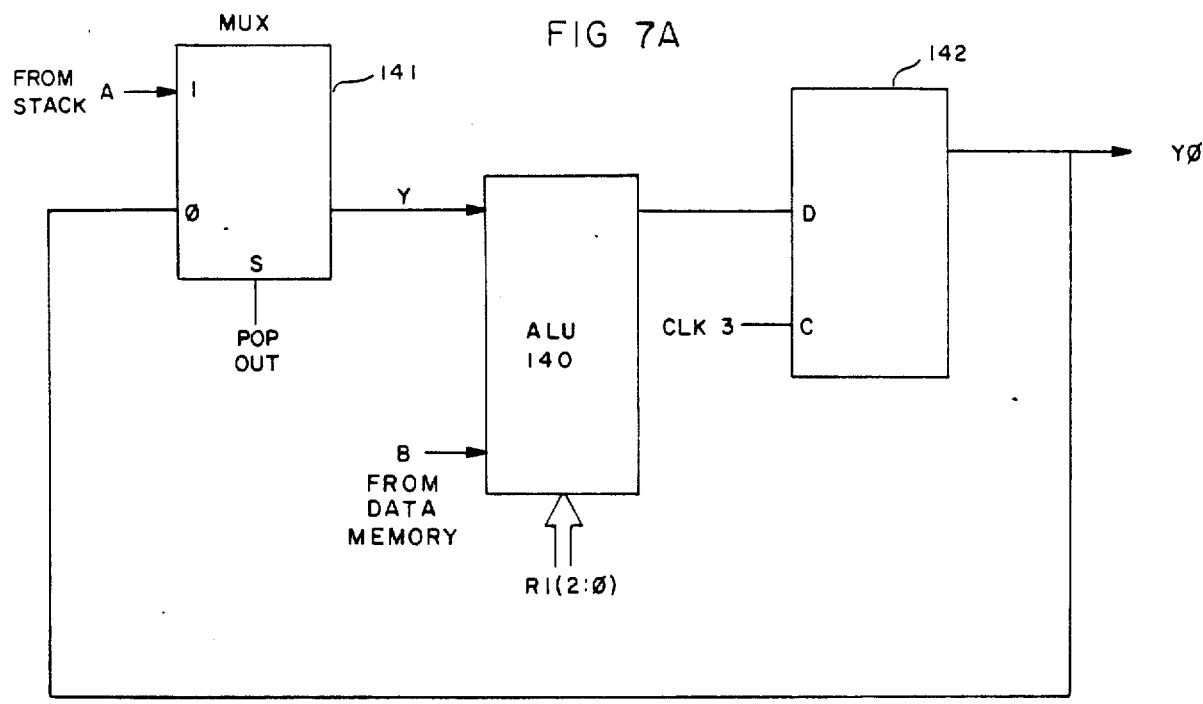
FIG. 7A is a circuit diagram of an arithmetic and logic unit module which is useful in the simulation engine of FIG. 4.
FIG. 7B is a table that is useful in understanding the operation of the circuit depicted in FIG. 7A.

FIG. 7A is a circuit diagram of an ALU module 105 which is useful in the simulation engine 100 depicted in FIG. 4, and FIG. 7B presents a table detailing the operations of the ALU module in response to each of the eight conditions of the low order R1(2:0) control signals from finite state machine 102. The high-order R1(3) control signal is used to enable an operator to read the contents of the locations of the data memory which correspond to the locations of output elements in the network, as explained below (see discussion regarding FIG. 9E-5). The ALU module 105 includes an arithmetic and logic unit (ALU) 140 which receives the R1(2:0) control signals and which actually performs the specified arithmetic and logic operations on two input signals designated Y and B. The B input signal is provided by the data memory 104, and the Y input signal is supplied by a multiplexer 141. The multiplexer 141, in turn, selectively couples either the A input signal from stack 106 or the ALU module's own Y0 output signal, which is stored in a flip-flop register 142, to the ALU 140. The multiplexer is controlled by the POP OUT signal from the stack 108. If the R2(1:0) signals from finite state machine 102 enable the stack to transmit the POP OUT signal, the Y output signal from multiplexer 141 corresponds to the A input, which is supplied by the stack. Otherwise, the Y output signal from multiplexer 141 corresponds to the Y0 signal from flip-flop 142. The output of the ALU 140 is latched in flip-flop 142 in response to a CLK 3 clocking signal, which succeeds the CLK 2C timing signal.

The table in FIG. 7B details the eight operations performed by one specific embodiment of ALU 140 in response to the low-order R1(2:0) control signals. The R1(2:0) control signals are binary encoded to represent a numerical value between zero and seven with each value being represented by a line of the table. When R1(2:0)=0, the ALU 140 passes the Y signal to the D input of flip-flop 142 as shown in the first line of the table. If R1(2:0)=1, as shown in the second line of the table, the output of the ALU 140 is the complement of the Y input signal, which is coupled to flip-flop 142 for storage. If R1(2:0)=2 (third line), the ALU passes the B input from data memory 104 to flip-flop 142 for storage. If R1(2:0)=3 (fourth line), ALU 140 couples the logical AND of the Y and B inputs for storage in flip-flop 142, and if R1(2:0)=4 (fifth line), the B input is first complemented before the AND operation takes place. If R1(2:0)=5 (sixth line) or 6 (seventh line), an OR operation takes place on the Y and B inputs, with the B input being complemented if R1(2:0)=6. If R1(2:0)=7 (last line), an exclusive-OR operation takes place on the Y and B inputs.

Figure 8:
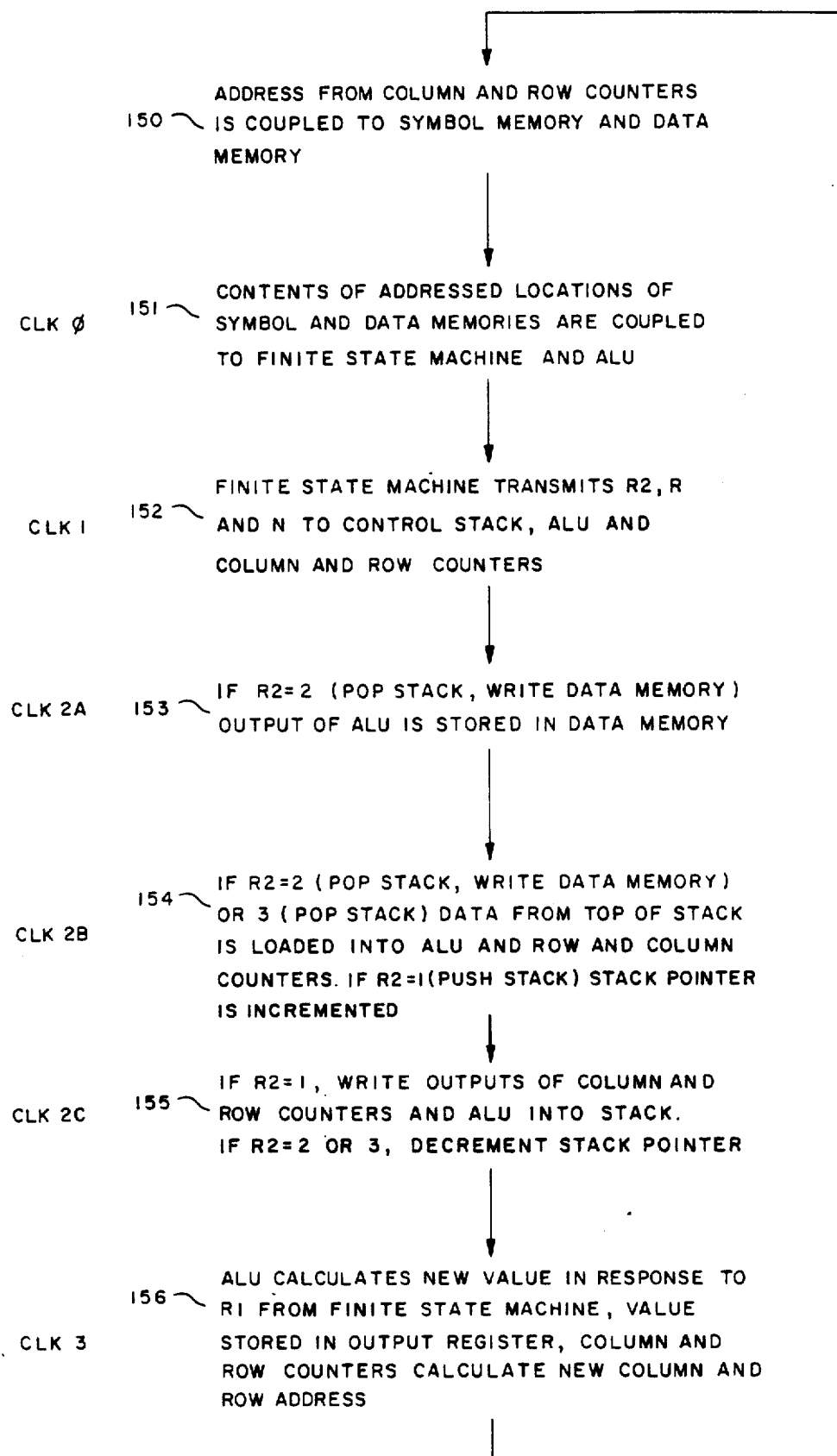
FIG. 8 is a flow diagram which is useful in understanding the operations of the simulation engine of FIG. 4.

FIG. 8 constitutes a flow diagram depicting the operations of the simulation engine 100 depicted in FIG. 4 for each iteration, that is, for each sequence of CLK 0 through CLK 3 timing signals, and indicates the timing signals at which each operation occurs. The simulation engine performs all of the operations depicted in FIG. 8 for each network element which it encounters during a simulation. Initially, an address from address computation unit 103 is coupled to the address inputs of symbol memory 101 and data memory 104 (step 150). During a first iteration, this address may be a reset address or an address which is forced into the address computation unit in a known manner by circuitry which is not shown in FIG. 4. In response to the CLK 0 timing signal the contents of the addressed location in symbol memory 101, which represents the type of network element at that location in the network, are coupled to the high-order address inputs of finite state machine 102 (step 151). Simultaneously, the contents of the addressed location in data memory 104 are coupled to the B input terminal of ALU module 105. The CLK 0 timing signal energizes an output enable terminal (OE) on each of memories 101 and 104.

In step 152, in response to the CLK 1 timing signal, which clocks the output register of the finite state machine, the finite state machine transmits the R2(1:0), R1(3:0) and N(2:0) control signals. The N(2:0) signals are coupled to control input terminals of the column and row counters 107 and 108 of address computation unit 103; however, the condition of these counters does not change until they receive the CLK 3 clocking signal as described below (step 156). Also in step 152, the low order R1(2:0) control signals are coupled to the control input terminals of ALU module 105. The high order R1 control signal, specifically R1(3), enables the operator to obtain the output, signals of the network under test from the data memory 104 as described below in connection with the example in FIGS. 9A through 9E-5. Finally, the two R2(1:0) control signals are coupled to the control input terminals of stack 106.

The sequential CLK 2A, CLK 2B and CLK 2C timing signals control all stack operations and indirectly control the storage of data produced by ALU module 105 in data memory and the data from of stack 106 in address computation unit 103 and ALU module 105. In response to the CLK 2A timing signal, if the binary-encoded R2(1:0)=2, the Y0 output of the ALU module 105 is stored in data memory 104 at the location identified by the address which is coupled to the address inputs of data memory 104 in step 150. It should be noted that the address in the data memory at which the data is stored is the address being transmitted by address computation unit 103 when the CLK timing signal is generated, that is, the address which was generated in step 150 of this iteration. The data from ALU module 105, however, would have been generated by the ALU module during the previous iteration (see step 156 below).

The operations of stack 108 in response to the CLK 2B and CLK 2C timing signals depend on whether the stack operation is a PUSH or a POP. If the stack operation is a POP, that is, if control signals R2(1:0)=2 or 3, the contents of the top of the stack are transmitted onto output lines 128. Simultaneously, the POP OUT control signal is transmitted. The POP OUT signal received at the LD load terminal on column row counters 110 and 111 then enables the address signals on 107 and 109 to be stored in the respective counters. The POP OUT signal received at the LD load control terminal of ALU module 105 enables the data signal from stack 106 to be received through the A input terminal of ALU module 105, and specifically through multiplexer 141 (FIG. 7A). In the next step (155), the CLK 2C timing signal enables the counter 121 to decrement to point to the storage location in memory 120, which now comprises the top of the stack.

Returning to step 154, if the R2(1) timing signal is negated and the R2(0) timing signal is asserted, that is, if binary encoded R2(1:0)=1, the operation is a PUSH operation and counter 121 is incremented to point to a vacant location in memory 120. During step 155, in response to the CLK 2C timing signal, the column and row address from address computation unit 103 and the Y0 output from ALU module 105 are written into the memory 120 at the location identified by counter 121, which location now constitutes the top of the stack 106.

In response to the CLK 3 timing signal (step 156) the ALU module 105 calculates and stores in flip-flop 142 (FIG. 7A) a new Y0 output signal. Depending on the conditions of the R1(2:0) control signals and the POP OUT signal, the new Y0 output signal may be based on the Y0 output signal from the previous iteration, the data popped by the stack in step 154 of this iteration, or data supplied by the data memory 104 in step 150 of this iteration. Simultaneously, the column and row counters 110 and 111 of address computation unit 103 are updated in response to the N(2:0) control signals. The counters are updated from their states as of step 154; accordingly, if the stack 106 was POPPED in step 154, the address which is updated in step 156 is the address provided by the stack, which was loaded in the address computation unit 103 during step 154. If the stack was not POPPED, the address which is updated is that which was provided by the address computation unit at the beginning of the iteration in step 150.

Following step 156, the simulation engine 100 returns to step 150 to begin a subsequent iteration.

The program of R2(1:0), R1(3:0) and N(2:0) control signals transmitted by finite state machine 102 during each iteration depends on the nature of the network under test and the logical operations, inputs and outputs represented by the symbols used to represent the circuit elements of the network stored in the symbol memory. The operations performed by simulation engine 100 will be illustrated in connection with a network of electronic circuit elements depicted in FIG. 9A. Specifically, FIG. 9A depicts a circuit diagram of a two bit adder having low order inputs A0 and B0, high order inputs A1 and B1, a low order output S0, a high order output S1, and a carry output C. The symbols used in FIG. 9A to represent the network are conventionally used in the layout and design of circuits in VLSI (very large scale integration) circuits. Fourteen different symbols are used in the circuit depicted in FIG. 9A, each representing a type of circuit element as defined in a table in FIG. 9B. Each type of element is associated with a letter symbol which is stored in the locations in symbol memory 101 corresponding to the locations in the network at which the elements are connected. The contents of the symbol memory are depicted in FIG. 9C.

In simulating the operation of the circuit depicted in FIG. 9A, the simulation engine will begin at the inputs at the left and proceed to the right and downward. As shown by direction pointer 20 (FIG. 3B), these directions are represented by N(2:0)=0 or 1. In addition, in some cases N(2:0)=4 may be encountered, which prevent the address computation unit 103 from changing state. For the simulation of the circuit of FIG. 9A, the simulation engine does not need to use the left and up directions, that is, directions represented by N(2:0)=2 and 3, since, for all elements, inputs are from the left and up, and outputs are to the right and down. Entries for R2, R1 and N (that is, the N for the next iteration), which are stored in the read-only memory of the finite state machine 103 (FIG. 4), are shown in FIG. 9B for N(2:0)=0, 1, and 4. However, no entries are shown for N(2:0)=2 or 3 (corresponding to the left and up directions), since these will not be encountered by simulation engine 100 in simulating the circuit depicted in FIG. 9A. It will be appreciated, however, that processing elements may be defined and used in connection with a simulation which will enable the simulation engine to step upwardly and/or to the left. As a result of the selection of the processing elements used in the example depicted in FIGS. 9A through 9E-5, the simulation engine will not, however, step in directions other than to the right and down.

A dash in a particular entry in the table on FIG. 9B indicates that that entry will not be encountered for the circuit of FIG. 9A, for the particular value of "N". Thus, if N(2:0)=1 during an interation, the "A" network element, shown in the first line in FIG. 9B, will not be encountered in the next iteration.

As has been mentioned, fourteen different symbols are used to represent the circuit elements the circuit in FIG. 9A, each represented by a letter. The definitions and characteristics of the circuit elements represented by the symbols are as follows:

(1) For the circuit element represented by the letter "A", the input to the element is from the left, and the outputs are to the right and down. In the circuit element represented by the symbol, the signal transmitted by both outputs is the same as the signal received at the input.

(2) For the circuit element represented by the letter "B", the input signals are received from the left and above. The output signal to the right is the same as the input signal from the left. The output signal down is the logical AND of the input signals.

(3) For the circuit element represented by the letter "C", the signal coupled over the output signal over the line down is the complement or inverse of the input signal received from the left. The output signal to the right is the same as the input signal from the left line.

(4) For the circuit element represented by the letter "D", the output signal over the line down is the logical OR of the input signal from the left line and the complement of the input signal from above. The output signal to the right is the same as the input from the left.

(5) For the circuit element represented by the letter "E", the output signal to the right is the same as the input signal from above.

(6) For the element represented by the letter "F", the output signal to the right is the logical OR of the input signals from the left and above.

(7) The letters "X" and "Y" represent input and output terminal elements respectively. The letters "G" and "S" are used to indicate the lower left and right corners of the array on which the circuit is drawn. The letter "Z" indicates that there is no circuit element at that location in the network.

(8) The "H" and "V" symbols represent horizontal and vertical network lines respectively, and the "K" symbol indicates a location in the circuit where horizontal and vertical lines cross, with no logical operation or interconnection between the lines or signals at the point where they cross. The output signals to the right and down are the same as the input signals from the left and above, respectively.

FIG. 9C is a memory map showing the contents of the symbol memory 101 during the simulation of the circuit depicted in FIG. 9A. Each letter corresponds to a circuit element and is keyed to the table of FIG. 9B. In addition to the letters representing the circuit elements and the G and S letter symbols, an operator also must inserts Z letter symbols in the left- and right-hand columns where other elements do not appear and also at the right-hand ends of rows of circuit elements which do not extend to the right-most column of the array, so as to indicate the end of the row of circuit elements.

FIG. 9D is a memory map showing the data which is initially stored in the data memory 104 (FIG. 4) by an operator as input signals or data, as well as data stored there by simulation engine 100 during a simulation in response to the input data. The data which are not enclosed by parentheses represents the conditions of the input signals at the input terminals to the network, which are stored in the memory 104 by an operator as initial input data, and data enclosed by parentheses represents data, and specifically the condition of the output signal Y0 from ALU module 105, deposited in data memory 104 by the simulation engine during the simulation.

The operations of simulation engine 100 programmed to simulate the circuit depicted in FIG. 9A will be described in connection with FIGS. 9E-1 through 9E-5. The initial input signals are the numbers not in parenthesis shown in the data memory map of FIG. 9D. The contents of the symbol memory are shown in FIG. 9C. The finite state machine is programmed as shown in FIG. 9B.

First, the detailed operations of the simulation engine will be described at each of the timing signals during each iteration, for the first several iterations, to illustrate the operation of the various components of the engine as outlined in FIG. 8. Then a general description of the operations performed at several iterations will be presented to illustrate the programming of the simulation engine for the simulation of an electronic circuit network.

The initial value of the N(2:0) control signals is "4". How this was obtained will be shown below in connection with iteration 95 on FIG. 9E-5. In the first iteration, and with reference also to FIG. 8, the memory address transmitted by address computation unit 103 is the reset address (0,0), where the first digit is the column address (the "C" column in FIGS. 9E-1 through 9E-5) transmitted by column counter 110, and the second digit is the row address ("R" column in FIGS. 9E-1 through 9E-5) transmitted by row counter 111. In response to the CLK 0 timing signal (FIG. 8, step 151) the symbol memory (the "SM DO" symbol memory data out column in FIGS. 9E-1 through 9E-5) transmits to finite state machine 102 signals which represent the symbol "Z", which is stored in the storage location of the symbol memory having address (00) as shown in FIG. 9C. The output signal from the data memory ("DM DO" data memory data out column) is irrelevant at this point, as shown by the letter "X".

In response to the CLK 1 timing signal, the finite state machine transmits the control signals [R2(1:0)=0, R1(3:0)=0, N(2:0)=0], which corresponds to the value stored in the finite state machine for the Z element and N=4 (as shown in the table in FIG. 9B). The stack is empty at the beginning of this iteration (except for a constant as explained below in connection with the eighty-sixth iteration on FIG. 9E-5), and because the stack control signals R2(1:0)=0, no stack operation occurs during this iteration (FIG. 8, steps 154, 155). The ALU module's Y0 output signal during this iteration is also irrelevant as indicated by the "X" in the ALU OUT column. Furthermore, no data is loaded into the data memory 104 (FIG. 8, step 153) during this iteration, as shown by the "DM DI" (data memory data in column an FIG. 9E-1). Because control signals N(1:0)=0 during the first iteration, the row counter 111 is incremented (see FIG. 5) in response to the CLK 3 timing signal (FIG. 8, step 156). This is the end of the first iteration.

During the second iteration (see the entries for the second iteration in the second line of FIG. 9E-1) the CLK 0 timing signal enables the symbol memory 101 (FIG. 4) to transmit the contents of the (0,1) location, which correspond to signals representing the "X" (input terminal) circuit element to the finite state machine, and the data memory 104 to transmit the input signal, which is stored at the (0,1) location therein, to the B input of ALU module 105 (FIGS. 4 and 7A). In response to the CLK 1 timing signal, the finite state machine then transmits the control signals [R2(1:0)=1, R1(3:0)=2, N(2:0)=0], which are contained in the N=1 entry in FIG. 9B for the "X" element. It should be noted that N(1:0)=1 was the condition of the N(1:0) control signals at the end of the previous iteration. Since the R2(1:0) stack control signals have the binary-encoded value "1", a PUSH operation is enabled, which occurs in response to the CLK 2B and CLK 2C timing signals. The address signals (0,1) from the address computation unit, which are coupled to the D1 and D2 inputs, respectively, of the stack 106 (see FIGS. 4 and 6A) are pushed onto top of the stack. This address is used as shown below.

Continuing with the second iteration, the ALU module 105 receives initial signal "1", which is the input signal from the data memory 104 at the B input terminal. Since the R1(2:0) control signals have the binary-encoded value "2", the ALU 140 (FIG. 7A) passes the input signal at the B input terminal (see FIG. 7B) to the D data input of flip-flop 142. In response to the CLK 3 timing signal, this signal is latched in flip-flop 142 and, as shown in the ALU OUT column in FIG. 9E-1, the Y0 output signal has the value "1". Also in response to the CLK 3 timing signal, since control signals N(2:0)=0, the column counter is incremented (FIG. 5). Thus, the address provided by address computation unit 103 for the third iteration is (C=1, R=1). This is the end of the second iteration.

For the third iteration, the contents of the (1,1) storage location in the symbol memory correspond to the "A" circuit element. These contents are transmitted to the finite state machine. In response to the CLK 1 timing signal, finite state machine 102 transmits control signals [R2(1:0)=1, R1(3:0)=0, N(2:0)=1] which are shown in the N=0 entry for the "A" circuit element as depicted in the table in FIG. 9B. Since the control signals R2(1:0)=1, the stack operation again is a PUSH operation. In response to the CLK 2B timing signal, the counter 121 in the stack 106 is incremented to point to a storage location in memory 120 which represents the new top of the stack. The (1,1) address and the Y0=1 output signal from ALU module 105 (which, it should be noted, was initially generated in response to the CLK 3 timing signal of the previous, or second, iteration) is then stored in the location identified by couner 21 in response to the CLK 2C timing signal. In response to the CLK 3 timing signal, the outputs of the ALU module 105 and address computation unit 103 are updated. Since the control signals R1(3:0)=0, and the POP OUT signal provided by stack 106 is negated, ALU module 105 couples the Y0=1 output signal generated during the previous iteration for storage in register 142 of ALU module 105. Thus, the output of ALU module 105 is unchanged from the previous iteration. However, since the address control signals N(2:0)=1, the row counter is incremented (FIG. 5), and the new address to be used during the fourth iteration is (1,2) as shown in the corresponding columns of the fourth iteration.

In the fourth iteration, the circuit element at the (1,2) location in the network (see FIG. 9A) corresponds to the letter "C" and the control signals provided by the finite state machine 102 are [R2(1:0)=2, R1(3:0)=0, N(2:0)=0]. Since the control signals R2(1:0)=2, a POP-AND-WRITE stack operation is enabled. In response to the CLK 2A timing signal (FIG. 8, step 153), the Y0 output signal, which is a "one", from ALU module 105 is deposited and stored in the location in data memory 104 specified by the address provided by address computation unit 103. This storage is depicted in FIG. 9D, the memory map of data memory 104, and specifically at location (1,2), which shows the "one" enclosed by parentheses. In response to the CLK 2B timing signal, the contents of the location identified by counter 121 are coupled onto lines 128, that is, the top of the stack is popped. The address portion is loaded into the address computation unit and the data portion is transmitted to the ALU module 105, accompanied by the POP OUT signal. Thus, the counters of the address computation unit contain the values (C=1, R=1). In response to the CLK 2C timing signal, the stack's address counter 121 decrements and points to the stack location representing the new "top of the stack" (FIG. 8, step 155). Then, in response to the CLK 3 timing signal, the following occurs: (a) since the control signals R1(3:0)=0, and since the POP OUT signal is asserted, the ALU module 105 passes the input signal from the stack for storage in output register 142 (FIG. 7B), and (b) since control signals N(2:0)=0 the column counter 107 increments so that the address for the fifth iteration is (2,1), as shown in the respective columns of FIG. 9E-1 for the fifth iteration.

The same procedure is repeated for the succeeding iterations. In the eighty-sixth iteration, the constant stored in the stack is used as follows. In that iteration the network element corresponds to the "G" element (FIG. 9B), which is provided by the operator to define the lower left-hand corner of the network (FIG. 9A). At that time, the stack is empty of all data deposited therein during the simulation by the engine; the only data present in the stack is the constant value mentioned above. The constant represents the address of the upper right-hand corner of the array (C=8, R=0), which is popped in the eighty-sixth iteration, and loaded into the address computation unit. Since control signals N(1:0)=1 during that iteration, the row counter is incremented, and the address for the eighty-seventh iteration is (8,1), which is one row down from the upper right-hand corner. The simulation engine then steps down the right-hand side of the network in succeeding iterations.

In the eighty-ninth, ninety-third and ninety-fourth iterations, the control signals R1(3:0)=8, that is, the R1(3) control signal is asserted. In this condition, the contents of the data memory at the indicated locations are transmitted to the operator. These contents, which are depicted in the right-hand column of the memory map shown in FIG. 9D, represent the simulated responses of the circuit network to the values of the inputs in the left-hand column of the same memory map, as determined by simulation engine 100. These responses were deposited in the data memory in iterations 23, 70 and 77 (FIGS. 9E-2, 9E-4 and 9E-5, respectively).

Finally, in the ninety-fifth iteration, the "S" element is processed. In response to the "S" element (FIG. 9B), the control signals N(2:0)=4, which is the initial condition for the control signals at the beginning of a simulation, as noted above in the discussion concerning the first iteration. An operator may deposit new values representing network input signals in the data memory 104 if another simulation is desired.

With this background, the programming of simulation engine will be generally described with reference to FIGS. 9E-1 through 9E-5. The various values representing the R2(1:0), R1(3:0) and N(2:0) control signals in the table shown in FIG. 9B are selected so that the simulation engine will operate according to the desired program of operation. The first iteration is an initialization operation to place the simulation engine 100 in a selected condition before the engine processes the network circuit elements. It is thus desirable to provide a "Z" element in the upper left-hand corner as the first element encountered during the simulation, which places the simulation engine in the selected condition.

In the second iteration, the input terminal represented by the letter "X" causes the simulation engine to push the network address (0,1) of the element onto the stack. This is used for return information; as shown below (iteration 11) when the simulation engine has proceeded as far as it can in the simulation using the input data at this input terminal element, it will return to this input terminal element and step down the left side of the network to the next input terminal element. The output of the ALU module 105 at the end of this iteration correspo,nds to the value of the input data for the input terminal element, which was received from the data memory.

In the third iteration, the simulation engine processes the network element at location (1,1), which has the symbol "A". This element causes a branch, as the element's outputs go both to the right and down. Here, the simulation engine pushes the address and ALU module's output onto the stack, to be retrieved after it has completed the first leg of the branch (iteration 5). The first branch leg which is taken by the simulation engine is the downward leg. The contents of register 142 in ALU module 105 correspond to the output of the A element in the downward direction, which, it should be noted, is the same as the input signal to the element from the left (see FIG. 9B).

In the fourth iteration, the simulation engine processes the element at location (1,2), which has the symbol "D" and which is the first element in the first branch from the "A" element in location (1,1). This D element also requires an input from the left, which is stored in the data memory 104, but which is not now available to the ALU module 105. Thus, the simulation engine is programmed to enable the stack to perform a POP AND WRITE operation [thus, R2(1:0)=2] to store the value of the input data from the element above [that is, the A element at location (1,1)] in the data memory 104, at the location corresponding to the location of the circuit element in the symbol array. This stored data is used during the thirteenth iteration, when the second input data will be available to the ALU module 105. The stack operation in this iteration also causes the simulation engine to pop the top of the stack 106 and sequence to the second leg of the branch from the A element processed in the third iteration.

Returning to the third iteration, it should be noted that the simulation engine 100 first proceeded along the downward leg of the branch, with the rightward leg of the branch being taken second. In the definitions of the circuit elements in FIG. 9B used in the network of FIG. 9A at which branches can occur, namely those elements which have two output directions, it will be appreciated that the output signals to the right are the same as the input signals from the left; accordingly, the input signals to the branching elements from the left can be used directly by the elements in the second leg of the branch without having to be processed through the ALU module 105. Thus, when the simulation engine returns to begin the second, rightward, leg of the branch, the simulation engine can immediately step to the first element in the second leg, namely, the first element to the right of the element at which the branch occurred, without first returning to the element at which the branch occurred. This is illustrated in interation five.

Thus, in iteration five, the simulation engine, on returning from the downward leg of the branch from the circuit element at location (1,1), steps directly to the circuit element at location (2,1). Since this element, which has the symbol "C", also has outputs both to the right and down, a branch again occurs. The simulation engine again first takes the downward leg, and pushes the data and address onto the stack as return information. Since the downward output signal of this element is the complement of the input signal (see FIG. 9B), the output of the ALU module is the complement of the input signal of the circuit element, which was loaded into the ALU module's register 142 when the stack 106 popped during the fourth iteration.

For the sixth iteration, the simulation engine steps to the element at location (2,2) which, like the element processed in the fourth iteration, requires a second input (from the left). Thus, the simulation engine deposits the (above) input value in the data memory 104, at the location corresponding to this element, for use during iteration 16. The return information is popped and the address stored in the address computation unit 103 and the data returned to the ALU module 105. The address computation unit is enabled to step to location (3,1) for the seventh iteration.

In the seventh iteration, the simulation engine steps across the horizontal conductor at location (3,1), with the finite state machine enabling the column counter 107 (FIG. 4) to increment. In the eighth and ninth iterations, the simulation engine performs the same operations as in the third and fourth iterations. It should be noted that the element encountered in the eighth iteration, which is represented by the letter "A", is the same type of element as is encountered in the third iteration. The simulation engine uses the "Z" symbol which is encountered in the tenth iteration to indicate the end of the row. The fact that there is no circuit element to the right of the rightmost "A" element in the row has no effect on its operation or the operation of the engine in response thereto In the tenth iteration, the simulation engine takes the branch to the right from the "A" circuit element at location (4,1), and encounters the blank element represented by the symbol "Z". This element enables the simulation engine to pop the stack and write the contents in the address computation unit 103 and ALU module 105. This returns the simulation engine to the input terminal element at location (0,1), as shown in the eleventh iteration. In the eleventh iteration, since control signals N(2:0)=1 (instead of "0" as in the second iteration, when the input element was first processed), the address computation unit steps to location (0,2), where it processes the next input element. The value of the second input provided by the operator, a "one", which is stored in location (0,2) of the data memory 104, is coupled to the ALU module 105, and stored in its register 142.

During the next several iterations, the simulation engine uses the second input value. In the thirteenth iteration, the simulation engine again processes the element at location (1,2) having the symbol "D". This time, the simulation engine has the second input value in the ALU module 105. The input value provided by the element at location (1,1), which was stored in the data memory location (1,2) in the fourth iteration, is now retrieved and coupled to the B input of ALU module 105. The ALU module 105 then performs a logical operation on these inputs, and loads the result in its output flip-flop 142 (FIG. 7A).

A branch also occurs at the "D" element at location (1,2). Thus, before the ALU module stores the result of the logical operation in flip-flop 142, the simulation engine stores the return information in the stack. Thus, the value of the second input data, which is the same as the initial data provided by the second input, and the return address (1,2) are stored on the stack as return information. Note that, as shown in FIG. 8, the stack operation (steps 153, 154, 155) occurs before the ALU module operations (step 156) and so the input value which is stored in the stack for use in the second leg of the branch is the same as the input, from the left, which was provided to the "D" element where the branch occurred.

In the fourteenth iteration, the simulation engine processes the element at location (1,3), which is represented by the letter "E". This element has only one input (from above) and one output (to the right) and performs no logical operation, so the engine cycles to iteration fifteen. In the fifteenth iteration, the engine steps to the element which receives the output of the "E" element, that is the "F" element at location (2,3). This element requires an additional input value from the element at location (2,2), and so the simulation engine stores the input value from the element at location (1,3) in data memory 104, at the location (2,3). This data will be used in the seventeenth iteration. The simulation engine also pops the stack to return to the second leg of the branch which occurred in the thirteenth iteration.

In the sixteenth iteration, the simulation engine steps to the second leg of the branch that occurred in the thirteenth iteration, and processes the "B" element at location (2,2). In this condition, the input value from the "C" element at location (2,1), which was stored in data memory 104 in the sixth iteration, is coupled as the B input to ALU module 105. The second input value from the "X" input element at location (0,1), is already stored in the register 142 in the ALU module, as a result of the stack operation in the fourteenth iteration. The ALU module performs the logical operation required by the "B" element at location (2,2) and stores the output in flip-flop 142.

A branch also occurs in the sixteenth iteration, since the "B" element has outputs both to the right and down. Thus, prior to the ALU operation, return information, including the value of the input to the "B" element from the left and the address of the element, are pushed onto the stack.

In the seventeenth iteration, the simulation engine returns to the "F" circuit element at location (2,3). The left input to this element is stored in the (2,3) location in the data memory, having been stored there in the fifteenth iteration. The input from above was stored in register 142 of ALU module 105 in the sixteenth iteration. During this iteration, the data stored in the (2,3) location in the data memory is coupled to the B input of the ALU module, and the contents of register 142 are coupled to the Y input of ALU 140. The ALU performs the logical operation required by the finite state machine in response to the F circuit element. The result of the logical operation performed by the ALU module is then stored in flip-flop 142.

In iterations eighteen through twenty-two, the simulation engine steps across the horizontal path from the "F" element at location (2,3) to output terminal element "Y" in location (8,3), which is processed in the twenty-third iteration. In response to the "Y" element, the simulation engine performs a pop-and-write stack operation, which enables the output of the ALU module 105 to be written into the data memory 104 at location (8,3). The return information is then popped to enable the simulation engine to return to the second leg of the branch which occurred at the "B" element in location (2,2) in the sixteenth iteration. It should be noted that the output value from ALU module 105 which was stored in the data memory at location (8,3) was the same as the output value of the "F" circuit element at location (2,3).

The programming of the simulation engine to perform iterations twenty-four through eighty-two will not be described in detail; from the above discussion, the programming will be apparent to those skilled in the art. After data is stored in the (8,8) storage location in data memory 104, which corresponds to the "C" (carry) output terminal, the engine will return to the input element at location (0,5) in the eighty-second iteration. The simulation engine next steps down the left edge of the array, sequentially processing the "Z" elements in locations (0,6), (0,7) and (0,8). In the eighty-sixth iteration, the simulation engine processes the "G" element at location (0,9), which enables the simulation engine to pop the constant from the stack. The constant is selected to force the address computation unit 103 to sequence the engine the upper right-hand corner of the array. In the remaining iterations, the simulation engine steps down the right edge of the array, and, when the "Y" output terminal elements are processed transmits the value stored in the data memory 104 during iteration twenty-three for location (8,3), thirty-six for location (8,5), and seventy for location (8,8), along with the R1(3) control signal. These values are transmitted during the eighty-ninth, ninety-third and ninety-fourth iterations.

Finally, in the ninety-fifth iteration, the simulation engine encounters the element having the symbol letter "S". This element marks the lower left-hand corner of the array, and is the last element processed during a simulation. The finite state machine transmits the control signals N(2:0)=4 to place the simulation in a reset state preparatory for another simulation.

From the foregoing, the selection of the binary encoding for the R2(1:0), R1(3:0) and N(2:0) control signals in FIG. 9B will be readily apparent to those skilled in the art. The particular binary encoding selected will depend on the nature of the network being simulated, which will, in turn, govern the network elements that are chosen to represent the network and their definitions, that is, the number of inputs to and outputs from each network element and the logical operations that the element performs on the signals which it receives from the various inputs to result in the signals transmitted over the outputs. The definitions of the circuit elements govern (a) when a branch is to occur and the return information that is to be pushed onto onto the stack, (b) when a second input is required and when it is available, and thus when data are written into or retrieved from the data memory and (c) on a return from branch, when the simulation engine is to proceed along the second leg of the branch, the location to which the engine will return.

For example, in the example of FIGS. 9A through 9E-5, and with specific reference to circuit elements A, B, C, and D, it will be appreciated that the definitions of these elements requires that the output signals to the left be the same as the input signals from the right. Thus, when an element is processed at which a branch can occur, the return data is selected to be the signal received from the left, thus, the first leg of the branch is selected to be the downward leg. On the return, since the signal from the left, which has been stored as the return information, is the same signal which the branch element would transmit to the next element to the right, rather than returning to the branch element, the simulation engine can return to the first element along the second leg of the branch. Thus, on a return from branch, the N(2:0) control signals, which control the address calculation unit, enable the column counter to increment to start the simulation at the first element along the second leg of the branch. If, however, the branching element performs a logical operation on the signal which is passed to the second leg of the branch, the N(2:0) control signals would have to cause the address calculation unit to return to the branching element, and the R1(3:0) control signals would have to enable the ALU module 105 to perform the required logical operation before stepping to the second leg of the branch.

Furthermore, it will be appreciated that, since the address calculation unit 103 is under the control of the finite state machine 102, it can cause the simulation engine to step in any direction from one processing element to the next. Thus, the inputs to a processing element can be from any direction, and likewise the outputs from a processing element can be to any direction, which directions are controlled by the definitions of the processing elements.

The foregoing description is limited to a specific embodiment of this invention. It will be apparent, however, that this invention can be used, with appropriate modifications to the disclosed specific embodiments, in simulating diverse networks of defined types of network elements, and that the invention can be practiced in diverse systems than is described in the specification, and attain some or all of the advantages of the invention. Therefore, it is the object of the appended claims to cover all such variations and modifications as come within the true spirit and scope of the invention.

What is claimed as new and desired to be secured by Letters Patent of the United States is:

1. Apparatus for simulating a network of processing elements arranged in an array pattern, the processing elements comprising the network being of predetermined types each having selected characteristics and being identified by a unique representation, said apparatus comprising:
   a. memory means having a plurality of storage locations arranged in an array pattern corresponding to the array pattern of the network, each storage location storing the representation of the processing element at the corresponding location in the network;
   b. address computation means connected to said memory means for computing an address for transmission to said memory to identify a storage location in said memory; and
   c. control means connected to said address computation means and said memory for iteratively retrieving the representation of the processing element from the memory at the location identified by said address computation means and generating an address control signal in response to the retrieved representation, said address control signal being coupled to said address computation means to control the generation of an updated address for a succeeding iteration including storing, computing an address, retrieving the representation and generating an address control signal and said address computation means including counter means being responsive to said address control signal from said control means.

2. Apparatus as defined in claim 1 wherein said array pattern includes a plurality of rows and columns, said counter means including a row counter and a column counter which are independently controlled by the address control signal from said control means.

3. Apparatus as defined in claim 1 wherein said control means comprises finite state means that generates an address control signal in response to the representation received from said memory and to the address control signal of the previous iteration.

4. Apparatus as defined in claim 3 further comprising:
   a. data storage means having a plurality of storage locations arranged in an array pattern corresponding to the array pattern of the network for storing process data representative of the processing by the corresponding process element of input data; and
   b. processing means connected to said data storage means and said control means for receiving process data from said data storage means and processing it in response to control signals from said control means.

5. Apparatus as defined in claim 4 wherein said processing means includes logic means connected to receive process data from said data storage means and intermediate storage means connected to the output of said processing means for storing intermediate process data, the output of said intermediate storage means being connected to the input of said processing means and the input of said data storage means.

6. Apparatus as defined in claim 5 wherein said control means further includes storage control means connected to said data storage means and to said finite state means for selectively enabling said data storage means to store the contents of said intermediate storage means at the location identified by said address computation means.

7. Apparatus as defined in claim 6 further comprising stack means connected to said control means, said processing means and said address computation means for storing the contents of said intermediate storage means and the address from said address computation unit in response to a control signal from said control means.

8. Apparatus as defined in claim 7 wherein the output of said stack means is connected to said address computation means and to said processing means, said stack means being responsive to a control signal from said control means to transmit an address stored therein for storage in said address computation means and the corresponding intermediate storage means contents to the input of said processing means, said control means including means for generating control signals coupled to said address computation unit and said processing means for enabling said address computation means and said processing means to thereafter use the address and intermediate storage means contents from said stack.

9. Apparatus for simulating a network of processing elements arranged in an array pattern, the processing elements comprising the network being of predetermined types each having selected characteristics and being identified by a unique representation, said apparatus comprising:
  a. memory means comprising:
    (i) network storage means having a plurality of storage locations arranged in an array pattern corresponding to the array pattern of the network, each storage location storing the representation of the processing element at the corresponding location in the network; and
    (ii) data storage means for storing process data representative of processing by the processing elements in the network;
  b. address computation means connected to said memory means for computing an address for transmission to said memory to identify a storage location in said memory;
  c. processing means connected to said data storage means for receiving process data from said data storage means; and
  d. control means connected to said address computation means, said processing means and said memory for iteratively generating control signals for (i) enabling the retrieval of the representation of the processing element from the memory at the location identified by said address computation means and generating an address control signal in response to the retrieved representation, said address control signal being coupled to said address computation means to control the generation of an updated address for a succeeding iteration, and (ii) enabling the processing by said processing means of process data from said data storage means and said address computation means including counter means responsive to an address control signal from said control means.

10. Apparatus as defined in claim 9 wherein said array pattern includes a plurality of rows and columns, said counter means including a row counter and a column counter which are independently controlled by the address control signal from said control means.

11. Apparatus as defined in claim 9 wherein said control means comprises finite state means that generates an address control signal in response to the representation received from said memory and to the address control signal of the previous iteration of enabling the retrieval of a representation and enabling the processing by said processing means.

12. Apparatus as defined in claim 9 wherein said data storage means comprises:
  a. intermediate storage means connected to said processing means and said control means for receiving and storing the output of said processing means, the output of said intermediate storage means being connected to said processing means for coupling its contents thereto in response to a control signal from said control means;
  b. process data storage means having a plurality of storage locations arranged in an array pattern corresponding to the array pattern of the network, said process data storage means being connected to the output of said intermediate storage means, said address computation means and said control means for storing the output of said intermediate storage means at the location identified by address signals from said address computation unit in response to a control signal from said control means;
  c. stack means having a plurality of storage locations and connected to said intermediate storage means, said address computation means and said control means for storing process data from said intermediate storage means and an address from said address computation means in response to a control signal from said control means.

13. Apparatus as defined in claim 12 wherein said stack means comprises:
  a. random access memory means connected to intermediate storage means, said processing means and said control means and having a plurality of sequentially addressed storage locations for storing process data from said intermediate storage means and coupling data to said processing means in response to control signals therefor from said control means; and
  b. address control means connected to said control means and said random access memory means for identifying the respective storage locations in said random access memory means, said address control means comprising up/down counter means which increments and decrements in response to said control means enabling process data to be stored in and transmitted from said random access memory means.

14. Apparatus for simulating, in a series of iterations, a network of processing elements arranged in an array pattern with the processing elements comprising the network being of predetermined types each having predetermined characteristics and being identified by a unique representation, the representations of said processing elements being stored in a memory at addressable locations corresponding to the respective locations of the corresponding processing elements in the array pattern of said network, said apparatus comprising:
  a. means for retrieving a representation of a processing element from a location in the memory identified by an address;
  b. control means connected to said retrieval means including means for generating a process control signal and an address control signal in response to the type of processing element whose representation was retrieved by said retrieval means and the address of the processing element retrieved during the previous iteration;
c. data storage means for storing process data;
d. processing means responsive to said control means for retrieving process data from said data storage means and processing said retrieved data in response to process control signals from said control means, said processing means being further connected to said data storage means to store process data therein; and
e. address computation means said computation means including counter means responsive retrieval means and said control means to address control signals from said control means to generate an address.

15. Apparatus as defined in claim 14 wherein said control means also includes means for generating a process data storage means control signal and a stack control signal during each iteration of storing and retrieving process data, processing retrieved data and generating an address, and said data storage means comprises:
   a. intermediate storage means connected to said processing means for storing the output of said storage means during each iteration;
   b. process data storage means having a plurality of adddressable storage locations corresponding to addresses generated by said address computation means and connected to said control means for storing the contents of said intermediate storage means in a location identified by said address computation unit in response to said process data storage means control signal;
   c. stack means connected to said address computation means and said control means for storing the address from said address computation means and the contents of said intermediate storage means in response to a stack control signal from said control means.

16. Apparatus as defined in claim 15 wherein said control means generates an address control signal which enables said address computation means to generate address signals for identifying at least one of said types of processing elements from at least two directions, said process data storage means control signal generating means generating a control signal for enabling said process data storage means to store process data from said intermediate storage means when said type of processing element is being identified from one direction, and for enabling said process data storage means to transmit the contents of the addressed location when said type of processing element is being identified from the other direction.

17. Apparatus as defined in claim 16 wherein the representation of at least one of said types of processing elements enables said stack control signal generating means to generate a stack control signal to enable said stack to store the address corresponding to the location of said processing element and contents of said intermediate storage means, said stack control signal generating means being connected to said process data storage means control signal generating means to generate a stack control signal which enables said stack to transmit the address and intermediate storage means to said address computation means and said processing means, respectively, when said process data storage means control signal generating means enables process data to be stored in said process data storage means.

18. A method of simulating a network of processing elements arranged in an array pattern with each processing element in the array having a predetermined location identified by an address, the processing elements comprising the network being of predetermined types each having predetermined characteristics and being identified by a unique representation, the method comprising the steps of iteratively:
   a. using an address generated during the previous iteration to identify a processing element;
   b. generating a set of control signals in response to the type of processing element and the address of the processing element identified during the previous iteration;
   c. obtaining process data and processing the data in accordance with the generated control signals
   d. saving the process data for use in a future iteration; and
   e. generating address signals in response to the control signals to identify a processing element for the next iteration of using an address, generating a set of control signals, obtaining and processing process data, saving the process data and generating address signals.

* * * * *